US009968185B2

(12) United States Patent
Blick

(10) Patent No.: US 9,968,185 B2
(45) Date of Patent: May 15, 2018

(54) STURDY LIGHTWEIGHT TABLE BASE AND METHOD

(71) Applicant: John Blick, Laguna Beach, CA (US)

(72) Inventor: John Blick, Laguna Beach, CA (US)

(*) Notice: Subject to any disclaimer, the term of this patent is extended or adjusted under 35 U.S.C. 154(b) by 0 days. days.

(21) Appl. No.: 15/798,265

(22) Filed: Oct. 30, 2017

(65) Prior Publication Data

US 2018/0064240 A1    Mar. 8, 2018

Related U.S. Application Data

(62) Division of application No. 14/961,867, filed on Dec. 7, 2015, now Pat. No. 9,833,063.

(51) Int. Cl.

| | |
|---|---|
| *A47B 3/06* | (2006.01) |
| *B60B 33/00* | (2006.01) |
| *B25H 1/04* | (2006.01) |
| *A47B 13/06* | (2006.01) |
| *F16B 12/30* | (2006.01) |
| *A47B 13/02* | (2006.01) |

(Continued)

(52) U.S. Cl.
CPC ............. *A47B 3/06* (2013.01); *A47B 13/021* (2013.01); *A47B 13/06* (2013.01); *B25H 1/04* (2013.01); *B60B 33/0002* (2013.01); *B60B 33/0007* (2013.01); *B60B 33/0026* (2013.01); *B60B 33/04* (2013.01); *F16B 12/30* (2013.01); *F16B 12/52* (2013.01); *A47B 13/003* (2013.01); *A47B 2013/006* (2013.01); *A47B 2230/0025* (2013.01); *B60B 2200/43* (2013.01)

(58) Field of Classification Search
CPC ................ Y10T 403/39; Y10T 403/46; Y10T 403/4602; Y10T 403/555; Y10T 403/73; A47B 13/021; A47B 13/06; A47B 2013/022; B62B 3/02; B60B 33/0002; B60B 33/0007
USPC ........... 248/188, 188.8, 163.1; 108/155, 154, 108/158.11, 180, 187, 189; 211/182; 280/79.3, 47.34, 47.35
See application file for complete search history.

(56) References Cited

U.S. PATENT DOCUMENTS

| | | |
|---|---|---|
| 1,891,393 A | 12/1932 | Oppenlander |
| 2,425,675 A | 8/1947 | Graff |

(Continued)

FOREIGN PATENT DOCUMENTS

| | | |
|---|---|---|
| CA | 1066756 | 11/1979 |
| DE | 102005045455 | 4/2007 |

(Continued)

*Primary Examiner* — Janet M Wilkens
(74) *Attorney, Agent, or Firm* — Curtis L. Harrington; Harrington & Harrington

(57) ABSTRACT

A sturdy lightweight table support system offers advantages of self-squaring, sturdy design, a low unassembled volume combined with simple parts that enable easy assembly, a system that enables user specification of table size that will result in easily prepared components thus all but eliminating stocks of different sized components, and sturdy lockable height adjustments. The self-squaring is achieved with a corner bracket system that uses a corner bracket that is inset with respect to a cross member within which it is mounted so that bolted assembly will result in a large, even pressure about the butt end of the cross member against the post that is extremely resistive to angular displacement of the cross member with respect to the post in any direction.

12 Claims, 27 Drawing Sheets

(51) Int. Cl.
*B60B 33/04* (2006.01)
*F16B 12/52* (2006.01)
A47B 13/00 (2006.01)

(56) References Cited

U.S. PATENT DOCUMENTS

| | | | |
|---|---|---|---|
| 3,047,110 A * | 7/1962 | Saha | E04B 1/58 |
| | | | 403/189 |
| 3,531,147 A | 9/1970 | Johnson | |
| 3,613,606 A | 10/1971 | Grow | |
| 3,749,343 A | 7/1973 | Vlarschak | |
| 3,880,095 A | 4/1975 | Clark | |
| 4,093,167 A | 6/1978 | Rooklyn | |
| 4,235,559 A | 11/1980 | Rooklyn | |
| 4,735,469 A | 4/1988 | Liggett | |
| 4,805,260 A | 2/1989 | Tooth | |
| 5,052,565 A | 10/1991 | Zachrei | |
| 5,579,621 A | 12/1996 | Fang | |
| 5,661,936 A | 9/1997 | Ellingson | |
| 5,857,306 A | 1/1999 | Pellock | |
| 5,921,049 A | 7/1999 | Sugiyama | |
| 6,032,431 A | 3/2000 | Sugiyama | |
| 8,800,232 B1 * | 8/2014 | Keenan | E04B 1/41 |
| | | | 14/74.5 |
| 2005/0156086 A1 | 7/2005 | Patterson | |
| 2005/0236809 A1 | 10/2005 | Haneda | |
| 2005/0265778 A1 | 12/2005 | Tzeng | |

FOREIGN PATENT DOCUMENTS

| | | |
|---|---|---|
| EP | 1338218 | 8/2003 |
| GB | 2319553 | 5/1998 |

\* cited by examiner

STURDY LIGHTWEIGHT TABLE BASE AND METHOD

FIELD OF THE INVENTION

The present invention relates to improvements in the field of inexpensive table support structures having high strength and high precision construction, a design approach amenable for just-in-time manufacturing that can be used for a wide variety of applications requiring stability and durability.

BACKGROUND OF THE INVENTION

Sturdy table base supports that have high load bearing capacity and deformation resistance are usually custom made, expensive, heavy, and dedicated to one fixed mode of use, configuration or size. Examples of sturdy, stable, and exacting table supports include optical benches, fixed height work benches, and table bases architecturally custom built into a building. Work benches require sufficient strength to support both the weight of work materials, tools and support structures as well as the working forces produced when the materials are processed while being supported. As a conventional example, a sturdy table base may have a height of 0.8 meters and a horizontal area of 1.0 meter by 3.0 meters and weigh 160 kilograms. These types of tables are usually welded and may require a set of holding fixtures during assembly to insure that they are consistently properly aligned. Production setups are generally fixed so that different sized tables will require a specific combination of sets of pre-specified parts and holding fixtures for each size of table to be produced. A required inventory of pre-specified parts for each one of a number of table sizes commercially offered can require a manufacturer to stock a sizeable inventory representing a sunk investment cost that will necessarily increase the cost to consumers.

Each different size or other aspect of configuration offered can easily multiply the numbers of sets of components and thus multiply total inventory cost. Conversely, an inability to make or offer different sizes of table supports and tables will reduce the market penetration for a type of table construction because it does not meet enough of a market segment customers' needs. In this case users would likely, even though reluctantly, select other types of tables in order to meet their space and size requirements. What is therefore needed is a table support system which can give table purchasers the flexibility to specify a large number of table size attributes in order that table manufacturers be able to make hundreds of different sizes of tables without having to incur the sunk cost of stocks of different sized components for each combination that might be specified by a customer and thus enable a wide variety of table supports to be made available at a lower price.

SUMMARY OF THE INVENTION

A sturdy lightweight table support system offers advantages of (1) self-squaring, sturdy reliable design, (2) a low unassembled volume for reduced cost shipping, (3) simple parts that enable reliable, user friendly assembly, (4) a simplified assembly system that enables standardization of some components and enables dimensional variance of other components, especially extruded components, by simple length cutting to produce different table sizes without the need to stock different lengths of such extruded components.

A self-squaring attribute is achieved by focussing dimensional precision on the more easily controllable square cut ends of the lengths of horizontal members. The ability to isolate a major aspect of precision on the horizontal members with respect to the corner posts is achieved with a corner bracket system. The corner bracket system uses a corner bracket that is supported within and near the ends of the horizontal members. The individual corner brackets are inset with respect to the high precision square cut ends of the horizontal member. The fixed attachment of the bracket in a slightly inset position with respect to the square cut ends of the horizontal members enables bolting of the brackets to the corner posts with forces created in the direction of a square post so that the bolted assembly will result in a large, evenly distributed bearing pressure force about the butt end of the horizontal member. The precision square cut ends of the horizontal members are placed under high bearing pressure against their respective horizontal posts to orient the horizontal members at an exact, strong right angle relationship. The result is a structure with very strong resistance to angular deflection of the table support using this square cut system. The corner bracket undergoes forced displacement toward the post and creates a high force pulling tension of the horizontal member in the direction of the square post.

The stability of each end of each horizontal member with respect to the post to which it is attached is synergized and mutually enforced when four horizontal members are connected between four posts to form a closed rectangular cell structure. Any force applied to one of the four posts and against or away from a diagonally opposite post would require the other two diagonally oriented posts to experience an angular opening or closing force, in addition to the angular closing or opening forces of the two diagonally oriented posts being acted upon. As a result, an attempted deformation of a rectangular cell made up of four posts and four cross members that each have two ends strongly attached to the posts (such as those that may lie in a horizontal plane) would have the combined strength of eight horizontal-member-to-post connections opposing it.

BRIEF DESCRIPTION OF THE DRAWINGS

The invention, its configuration, construction, and operation will be best further described in the following detailed description, taken in conjunction with the accompanying drawings in which.

DETAILED DESCRIPTION OF THE PREFERRED EMBODIMENT

Figure 1:
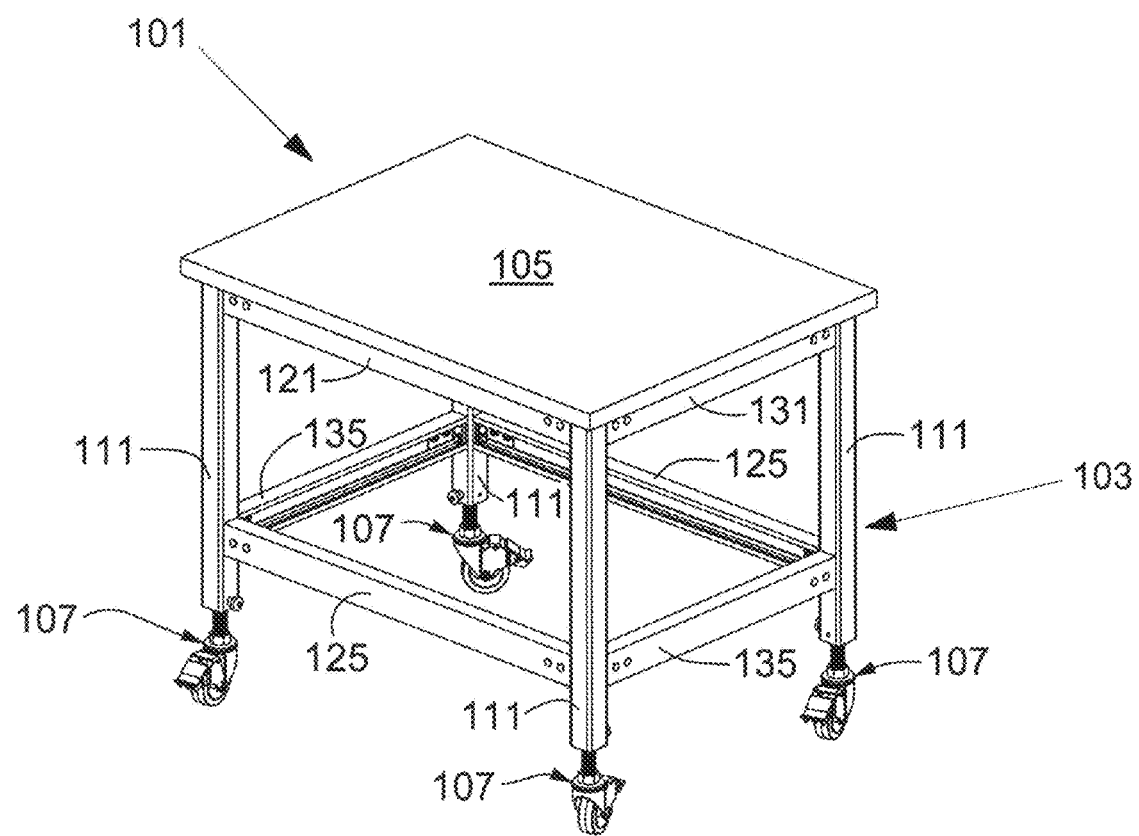
FIG. 1 is a perspective view looking downward onto an assembled table that illustrates a sturdy lightweight table base having four casters for ease of movement, the table base supporting a plain planar top is but one example of any number of tops that can be stably supported by the table base.

Referring to FIG. 1, a perspective view looking downward onto a table 101 illustrates a sturdy lightweight table base 103 supporting an upper structure which is shown as a plain planar top 105. Table base 103 has a rectangular cubic shape, but can be formed in any shape as well as multiples of the rectangular cubic shape shown. Top 105 can be of any shape and adapted to either be supported by or fixably attached to the base 103. Some of the elements of the table base 103 that are most prominent and at least some of which may be seen in FIG. 1 include a series of four wheeled casters 107 and four preferably identical vertically oriented predominantly square posts 111. A pair of longer upper cross members 121, a pair of longer lower cross members 125, a pair of shorter upper cross members 131, and a pair of shorter lower cross members 135 (to the extent that they can be seen in FIG. 1) are each shown as having their two ends attached between two associated ones of the four preferably identical vertically oriented predominantly square posts 111. For aesthetic and safety purposes the edges of the predominantly square posts 111 are rounded, but an important attribute of the square posts 111 is that they have four face surfaces, each at ninety degrees from an adjacent face surface to enable a square orientation of the cross members 121, 125, 131, & 135 which bear against those face surfaces.

Figure 2:
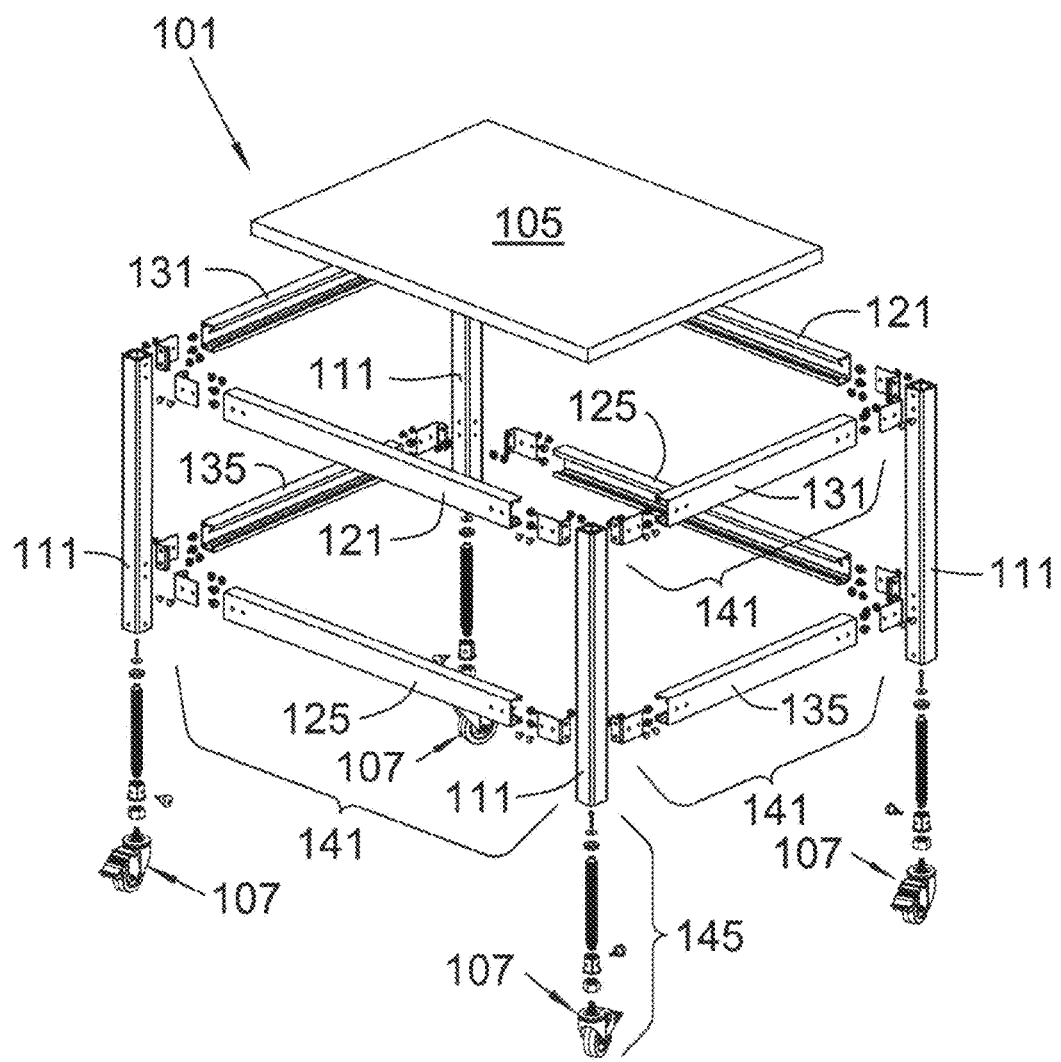
FIG. 2, an exploded view of the table seen in FIG. 1 illustrates an overview of nearly all of the components that make up the table and the sturdy lightweight table base sufficient to lay an orientational foundation for further discussion.

Referring to FIG. 2, an exploded view of the table seen in FIG. 1 which illustrates an overview of the bulk of the components that make up the table 101 and the sturdy lightweight table base 103 sufficient to lay an orientational foundation for further discussion. Additional smaller components in FIG. 2 are associated with the cross members 121, 125, 131, & 135 and are identified as a cross member assembly 141 the additional components associated with the casters 107, are seen as a caster assembly 145. The collection of all the component parts seen in FIG. 2 assists in orientation for explanations that follow, but may have a scale too small for complete identity in FIG. 2 such as brackets and fasteners that will be shown in detail.

Figure 3:
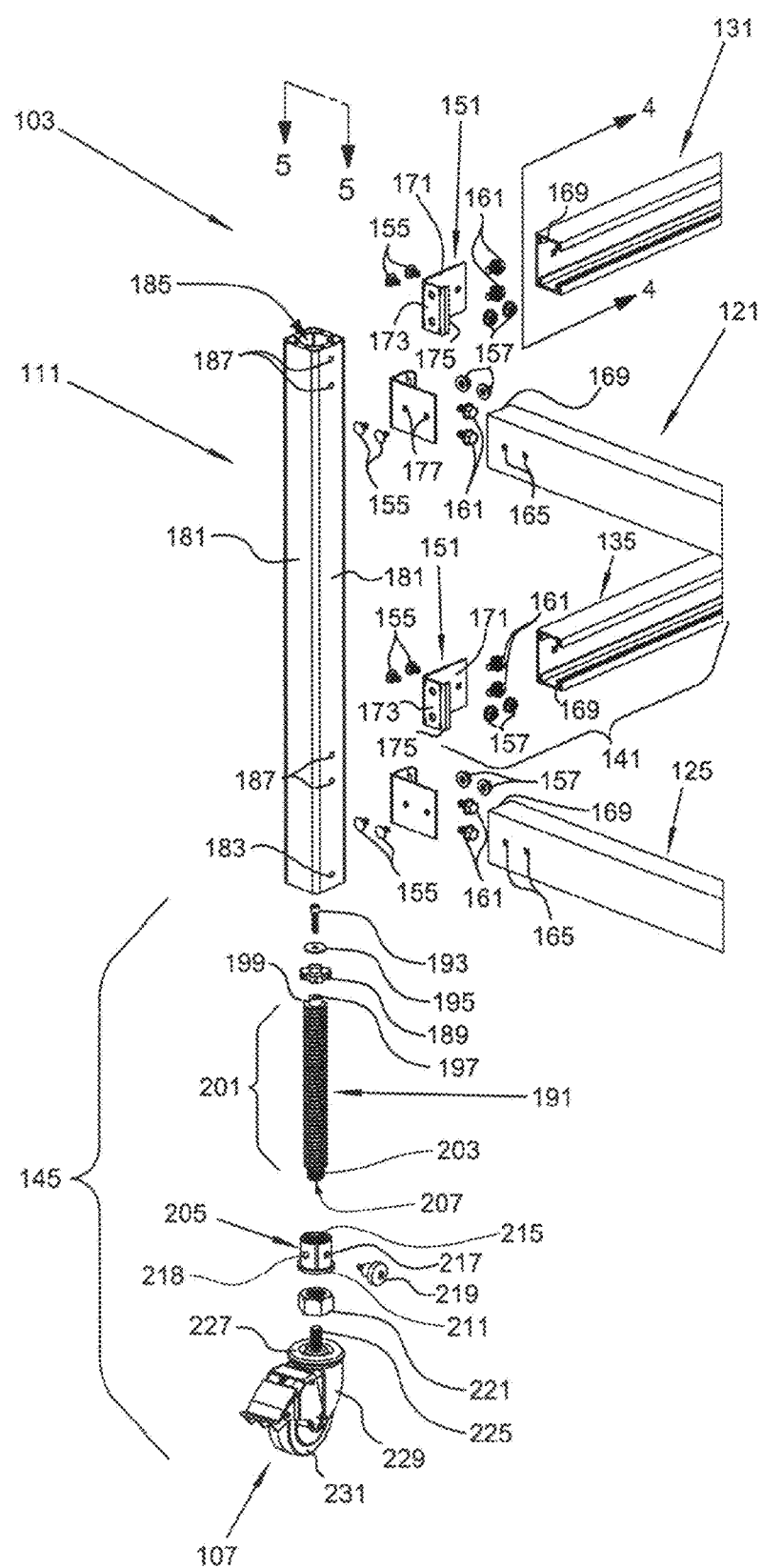
FIG. 3 is an expanded lateral outside view of one corner of the sturdy lightweight table base seen in FIGS. 1 & 2 and has sufficient expanded scale for further illustration.

Referring to FIG. 3, a closeup view of one corner of the sturdy lightweight table base 103, similar to that seen in FIG. 2, has sufficient scale for further illustration. The cross member assembly 141 for illustration is seen to contain one of the shorter lower cross members 135 as a central element. To one side of the cross member assembly 141 is seen a corner bracket 151, and a pair of carriage bolts 155. Carriage bolts 155 have a square-necked underside that prevents rotation in a square punched aperture. Corner bracket 151 is attached to respective associated cross members 121, 125, 131, & 135 at one side of corner bracket 151 for ease of access, but this need not be the case. A different shaped corner bracket 151 could be employed to engage the cross members 121, 125, 131, & 135 at different sides and locations.

Shown somewhat opposite each pair of carriage bolts 155 is a pair of serrated flange head nuts 157 which are engageable with the carriage bolts 155. Shown aligned and directed toward the square post 111 is a pair of serrated locking flange head screws 161. In FIG. 3, the outer facing surfaces of the pair of longer upper and lower cross members 121 & 125 can be seen as having a pair of square punched holes 165 as the pair of shorter upper and lower cross members 131 & 135 cannot be seen as well as they are facing away from the view of FIG. 3. Cross members 121, 125, 131, & 135 all have butt ends 169 which are used to bear against the square post 111 to form a sturdy, secure right angled support. Note that the shape of the corner bracket 151 follows the shape of the cross members 121, 125, 131, & 135. Cross members 121, 125, 131, & 135 can have a shape other than sharply square. Many variations are possible.

Each of the corner brackets 151 has an overall "J" shape when viewed from a vertical vantage point and preferably a constant overall height. A first planar member 171 is used for inserting the corner bracket 151 into the cross members 121, 125, 131, & 135. A second planar member 173 may generally be at a right angle to the first planar member 171 and lies opposite the square post 111. A third planar member 175 is shown as having an abbreviated length, but it need not be so abbreviated. Third planar member 175 can also have a complex shape that provides greater length at its top and bottom combined with removed portions which still enable access to the carriage bolts 155. Third planar member 175 extends from the second planar member 173, may generally be at a right angle to the second planar member 173, and may extend away from the second planar member 173 parallel to and in the same direction as the first planar member 171 extends from the second planar member 173.

Securing apertures 177 are seen in first planar member 171 and securing apertures 179 are seen in second planar member 173. As will be shown, the corner bracket 151 will be fixed to the cross members 121, 125, 131, & 135 and then bolted to threaded apertures within the square post 111 to cause the butt end 169 to be forced against a flat side 181 of the square post 111. The term flat side means that a square cut end will fit flat across it and be supported so that any of the cross members 121, 125, 131, & 135 will be constrained to be angularly deflected in any direction.

A threaded caster lock bore 183 is seen at a position at the middle of the flat surfaces 181 about the periphery of a lower end of square post 111. Square post 111 has an upper and lower opening 185 of which only upper opening 185 is seen in FIG. 3. As will be shown, several threaded caster lock bores 183 may be provided in a configuration so that two threaded caster lock bores 183 on two flat surfaces 181 can be used to separately to retain the caster assembly 145 and to lock the height of the caster assembly. Threaded caster lock bores 183 may appear on all four sides 181 and may be spaced farther from or closer to threaded cross member attachment bores 187 as desired.

The square post 111 is preferably an extrusion and is shown as having an opening 185 seen at the top of FIG. 3 and which extends through the square post 111. A set of upper and lower series of threaded cross member attachment bores 187, seen externally in vertical pairs, are provided to engage and hold the corner brackets 151. In most cases where the cross members 121, 125, 131, & 135 are of the same cross sectional size width and where their mounting is to occur at opposite ends of the square post 111, or evenly spaced along the posts 111, the posts 111 may be identical. Note that in describing sturdy lightweight table base 103, only a single rectangular basic unit of support will be illustrated, for simplicity.

Multiples of this single rectangular cubic basic unit can be formed in a direction perpendicular to any side of the single rectangular basic unit by providing more square posts 111 and the upper and lower cross members 121, 125, 131, & 135 for connection to the added square posts 111. In addition, even though only upper cross members 121 and 131 are shown as uppermost cross members and although lower cross members 125 and 135 are shown as lowermost cross members, other sets of cross members (not shown) can occur between any uppermost and lowermost cross members to provide further intermediate cross members for additional strength, where needed. The drawings show only upper and lower cross members 121, 125, 131, & 135 for ease of illustration.

Also seen in FIG. 3, below the bottom of the square posts 111 is an exploded view of caster assembly 145. As will be seen in further expanded detail in a subsequent drawing, the opening 185 is a bore having a series of vertical ribs (not yet shown) that engage a vertical translation and stabilization guide plate 189 which can move vertically within the opening 185 of the square post 111 in order to help stabilize and keep centered the upper end of a jacking thread member 191 that will reside within its square post 111. The vertical translation and stabilization guide plate 189 has an aperture (not clearly seen in FIG. 3) and attaches over the top of the jacking thread member 191, and is secured with a threaded member 193 and washer 195.

The jacking thread member 191 is seen in FIG. 3 to have a small upper threaded bore 197 partially within an small boss 199. Below the small boss 199 a main load flanked thread 201 is seen throughout the largest diameter of the jacking thread member 191, which may be an ACME thread. At the bottom of the jacking thread member 191, a smaller diameter thread set 203 underlies the lower terminus of the extent of the main load flanked thread 201, and occupies a medium diameter boss structure 199 that includes an internal threaded bore (not seen in FIG. 3). Below and separated from the smaller diameter thread set 203, is seen, a load flank nut 205 sized to engage the main load flanked thread 201 of the jacking thread member 191 to enable the jacking thread member 191 to turn and adjust its height with respect to the load flank nut 205 that will be captured and secured just inside of the bottom of the square post 111. At the base of the jacking threaded member, within and opening below smaller diameter thread set 203, and directly above the load flank nut 205, a threaded caster bore 207 is indicated with an arrow.

The load flank nut 205 has a vertical upward limit stop flange 211 which limits its insertion into opening 185 of the square post 111. Load flank nut 205 may have one or a number of lock apertures 217 and screw indents 218 for use in conjunction with one or more locking screws 219 (one is shown) that can be threaded into and through threaded caster lock bore 183 of the square post 111 to permit either passage through the load flank nut 205 via lock aperture 217 to lockably bear against and engage the main load flanked thread 201 to prevent its inadvertent turning, or to permit threading into and through threaded caster lock bore 183 of the square post 111 to engage against screw indent 218 to retain the caster assembly 145, including jacking thread member 191 vertically within the square post 111 even if the table base 103 is lifted. The load flank nut 205 and locking screws 219 are used to enable precision setting, adjustment and maintenance of a desired height and proper leveling for the table 101. In the load flank nut 205 shown, the provision of both lock apertures 217 and screw indents 218 enable retention to occur with one locking screw 219 independent of height adjustment which can be locked with another locking screw 219.

A height adjustment nut 221 is preferably permanently attached to the lower end of the jacking thread member 191, around the smaller diameter thread set 203 to provide a larger and manually accessible wrench engaging surface to enable an exacting height adjustment, under load, of an overall assembled table 101 without any need for support or disassembly. The same six sided hexagonal wrench engagement surface could be provided by an integrally formed surface, in lieu of the smaller diameter thread set 203 and fixed engaged height adjustment nut 221, but the increased cost of manufacture would be prohibitive. Fixation of the height adjustment nut 221 with respect to the jacking thread member 191 can be accomplished with LOCTITE®, or by welding or other fixation method. Once the height adjustment nut 221 is attached over the smaller diameter thread set 203, a threaded caster bore 207 opening to the underside of and within the smaller diameter thread set 203 has a set of internal threads 215 will be available below the load flank nut 205 and will be threadably engaged by other structures of the caster 107 (discussed below) to further provide support for structures below the smaller diameter thread set 203.

Below the load flank nut 205 a height adjustment nut 221 will reside to enable wrench engagement and turning of the jacking thread member 191 and possibly set to maximum extent of travel through the load flank nut 205 which corresponds to a lowest height setting for the table 101. Caster 107 has a threaded post 225 that fits into the downwardly opening threaded caster bore 207 concentrically within the smaller diameter thread set 203. A threaded post swivel housing 227 supports the threaded post 225. Swivel housing 227 is freely rotatable with respect to a wheel support member 229, typically having internal ball bearings (not shown) between wheel support member 229 and swivel housing 227 for free motion and long life. Wheel support member 229 rotatably supports a wheel 231.

Figure 4:
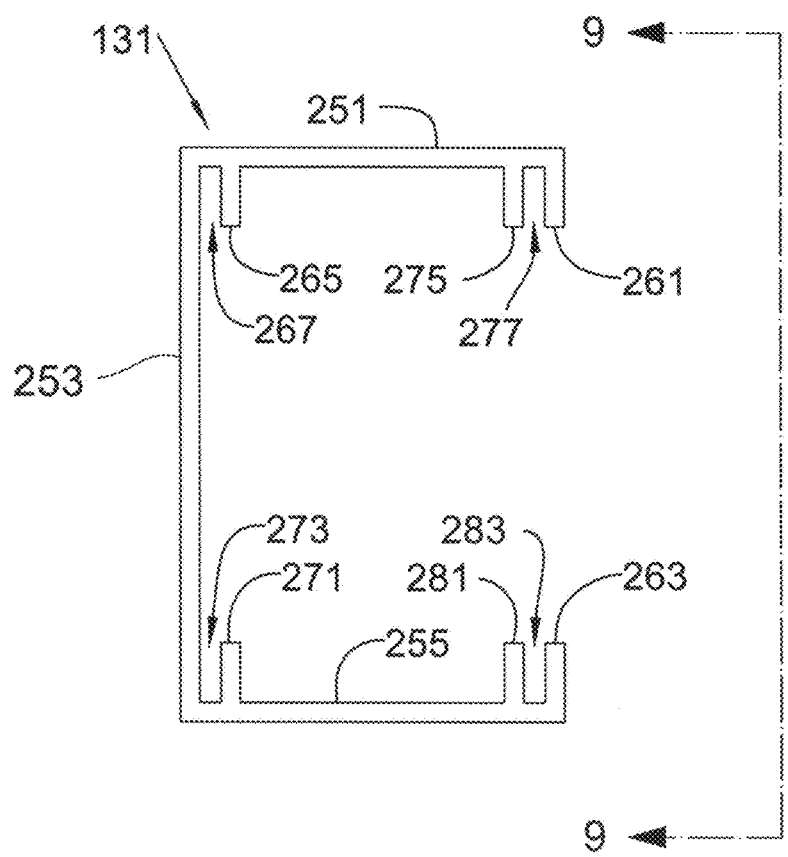
FIG. 4 is a plan view looking into the end of the horizontally oriented cross member taken along line 4-4 of FIG. 3 and illustrating an overall "C" shape and including structures that effectively form, with the vertical common wall, two pair of oppositely oriented slots.

Referring to FIG. 4, an end view of support cross member 131, for example, taken along line 4-4 of FIG. 3 may be identical to that for any of the support cross members 121, 125, 131, & 135 shown in FIGS. 1-3 both as to size attributes and internal details. The cross member 131 has a first wall 251 attached to a common wall 253, with common wall 253 further attached to a second wall 255. Walls 251, 253, & 255 need not be perfectly planar and may have less sharp edges but are generally planar and are at right angles with respect to each other. Wall 251 is generally parallel and opposite wall 255. First and second walls 251 and 255, at their farthest point from common wall 253, are attached to the abbreviated height first and second outer slot end walls 261 and 263, respectively.

A first inner slot wall 265 extends from the first wall 251 and extends in the direction of second wall 255 parallel and spaced apart from the common wall 253 to form a first inner slot 267 between the first inner slot wall 265 and common wall 253. A second inner slot wall 271 extends from the second wall 255 and extends in the direction of first wall 251 parallel and is spaced apart from the common wall 253 to form a second inner slot 273 between the second inner slot wall 271 and common wall 253. Second inner slot 273 is opposite a first inner slot 267. A first outer slot wall 275 extends from the first wall 251 and in the direction of second wall 255. First outer slot wall 275 is parallel and spaced apart from the first outer slot end wall 261 to form a first outer slot 277 between first outer slot wall 275 and first outer slot end wall 261. A second outer slot wall 281 extends from the second wall 255 and in the direction of first wall 251 parallel and spaced apart from the second outer slot end wall 263 to form a second outer slot 283 between second outer slot wall 281 and second outer slot end wall 263, and opposite first outer slot 277.

The first and second inner slots 267 & 273 and the first and second outer slots 277 & 283 provide guided support for the corner bracket 151 both between the first and second walls 251 and 255 and laterally between the common wall 253 and the between outer slot end walls 261 and 263 in each of the support cross members 121, 125, 131, & 135. The use of cross members 121, 125, 131, & 135 which are the same shape and cross sectional size, and that can be cut from a single length of extrusion will further enable stocking a single long extrusion that can be quickly and easily cut to various length cross members 121, 125, 131, & 135 as needed for different lengths of horizontal support.

Figure 5:
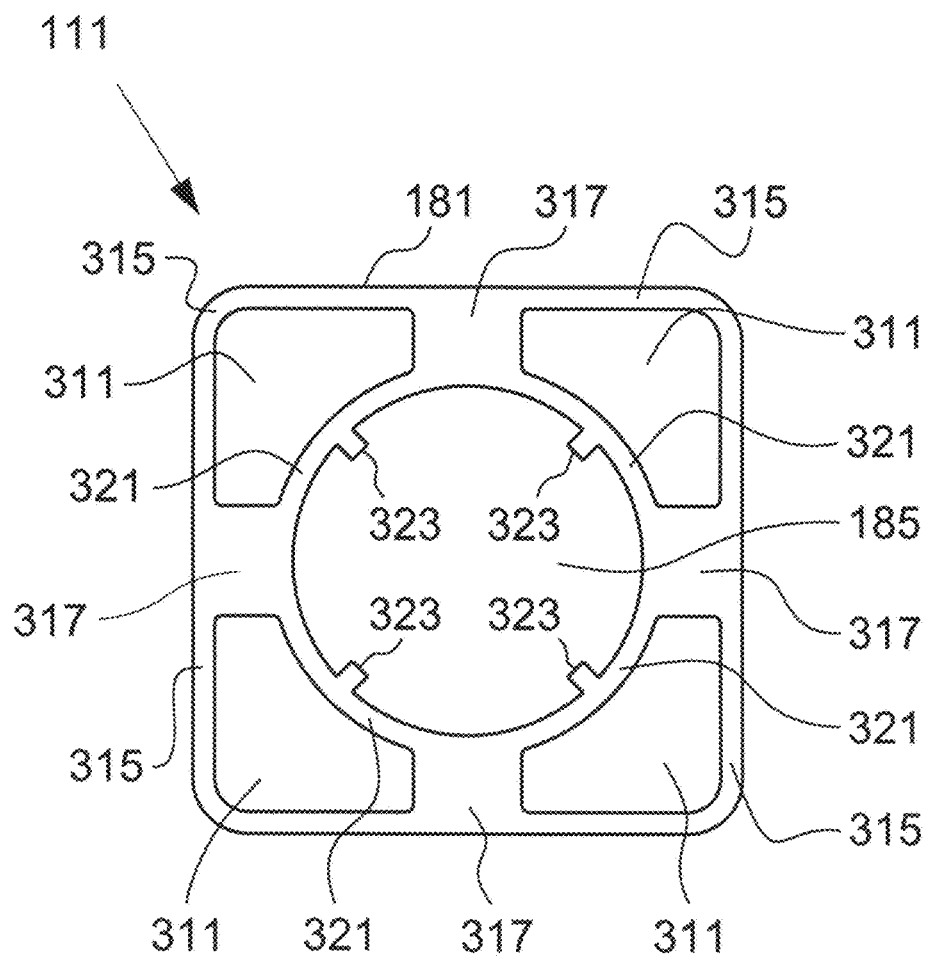
FIG. 5 is a plan view looking into the end of a vertically oriented post member taken along line 5-5 of FIG. 3 and illustrating a vertical post seen in FIGS. 1-3 having an overall square shape with four outer walls with curved corner transitions, each having a series of inwardly projecting supports engaging an inner tube, the inner tube having inwardly disposed ribs.

Referring to FIG. 5, a view taken along line 5-5 of FIG. 3, which is a plan view of the square post 111 looking into and through the square post 111 which may be an extrusion of constant cross sectional detail. An ability to use an extrusion for posts 111 further enables stocking a single long extrusion that can be quickly and easily cut to various lengths as needed for different length support as needed. As can be seen square post 111 has a constant cross section and is divided into five main spaces.

There are a series of four corner spaces 311. Each of the corner spaces 311 are bound by an outer wall 315 of the square post 111 that supports the flat side 181. Each of the corner spaces 311 is also bound by a pair of a series of four supports 317 that connect an inner tube 321 to the outer wall 315. Each corner space 311 is also bound by a portion of the inner tube 321 not adjacent the outer wall 315. The material of the four supports 317 is also used as a solid volume support structure that can be tapped to create threads, bores or apertures as needed, such as threaded cross member attachment bore 187, and the threaded caster lock bore 183.

The interior of inner tube 321 includes a series of circumferentially inwardly disposed axial ribs 323 which are used for stability and provision of anti-rotational engagement. Since FIG. 5 is an end view, the ribs 323 can be used to stabilize anti-rotational engagement throughout the length of the opening 185 at any vertical level inside the inner tube 321. The use of four ribs 323 helps to register external entry of load flank nut 323 as well as the vertical translation and stabilization guide plate 189, as will be shown in greater detail.

Figure 6:
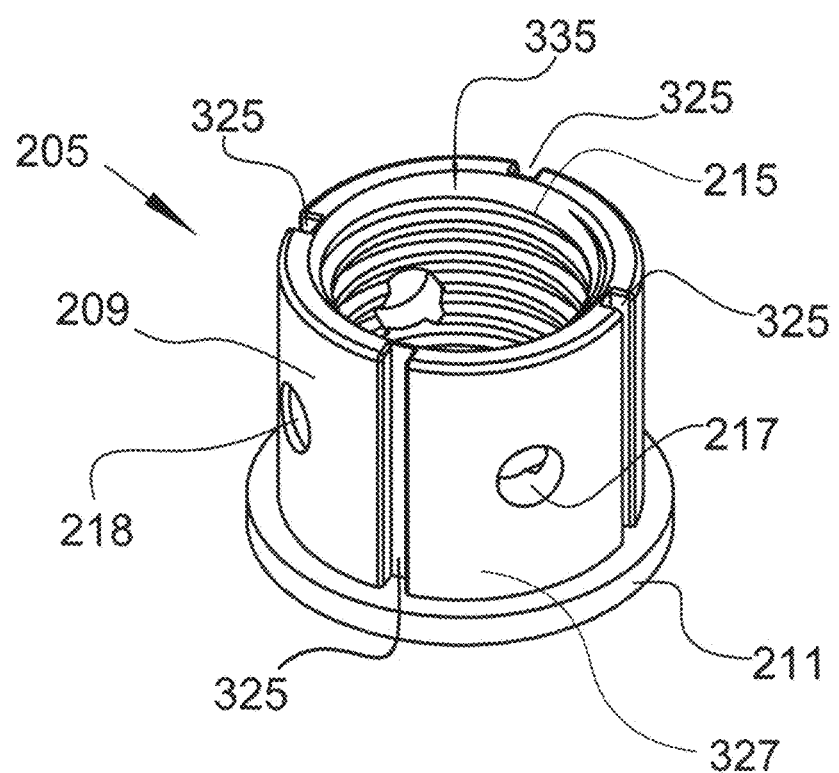
FIG. 6 is a perspective view of a load flank nut and illustrating internal threads within an internal bore, an outer upper diameter carrying grooves and overlying a lower diameter slightly larger than an upper diameter to limit the extent of travel into the post shown in FIG. 5.

Referring to FIG. 6, a perspective view of the load flank nut 205 illustrates expanded details. About the general upper cylindrical shape, a series of grooves 325 defines the quarter radial extent of a series of quarter radial rib sections 327 that substantially form an outer cylindrical body shape. The lower flange 211 can be seen as having a diameter slightly larger than the inner diameter of the opening 185 of the square posts 111. Lower flange 311 prevents entry of the load flank nut 205 into the opening 185 at the level of the lower flange 211. The rib sections 327 are slightly less in diameter than the internal diameter of the inner tube 321 sufficient to permit entry of the inwardly disposed axial ribs 323 of the inner tube 321 of the square post 111 which was seen in FIG. 5. The series of grooves 325 will accommodate the series of circumferentially inwardly disposed ribs 323 during axial entry the load flank nut 205 into the inner tube 321 and also register the load flank nut 205 such that one of the lock apertures 217 and one of the screw indents 218 can each align with adjacent located single threaded caster lock bores 183.

The screw indents 218 enable selective retention and locking of the caster assembly 145 and height locking by engagement with the main load flanked thread 201, when the load flank nut 205 is brought within opening 185 of the inner tube 321. The screw indents 218 are oriented opposite each other, and the lock apertures 217 are also located opposite each other. Thus, the user can insert one locking screw 219 into one threaded caster lock bore 183 of one flat surface 181 and insert another locking screw 219 into a threaded caster lock bore 183 of a next most adjacent flat surface 181 to be assured that one locks the height adjustment and the other secures the caster assembly 145 into its associated square posts 111.

This configuration ultimately enables the square post 111 to have a load bearing relationship with the caster assembly 145 and also enables the inner tube 321 of square post 111 to accept the portion of the main load flanked thread 201 above the load flank nut 205 within the inner tube 321 depending upon a given height adjustment of the table 101. Partially seen inside an opening 335 at the top of the load flank nut 205, are the internal threads 215. The main load flanked thread 201 will engage the internal threads 215 jacking thread member 191 to pass completely through the load flank nut 205.

Figure 7:
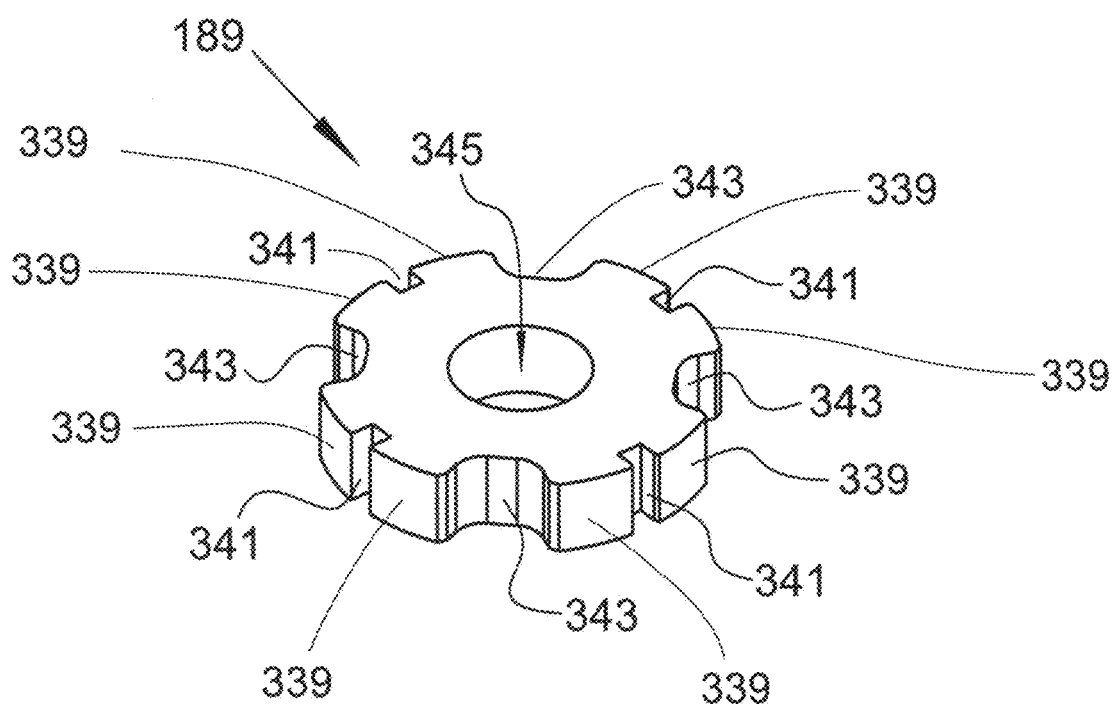
FIG. 7 is an upper perspective view of a stabilization guide plate having a series of four oppositely disposed guide slots each separated by an indentation, with the stabilization guide plate having a central surrounding through-opening to facilitate attachment.

Referring to FIG. 7, an expanded upper perspective view of the vertical translation and stabilization guide plate 189 seen in FIG. 3 illustrates a series of four oppositely disposed repeating structures which provide lateral stability to the top of the jacking thread member 191 when it is within the opening 185 within the inner tube 321 of square post 111. A series of radial end pairs have curved ends 339 and are each interrupted by a guide slot 341. Guide slots 341 will also accommodate the series of circumferentially inwardly disposed ribs 323 during axial entry of the vertical translation and stabilization guide plate 189 into the inner tube 321. Guide slots 341 will also register the vertical translation and stabilization guide plate 189 when it is brought within opening 185 of the inner tube 321. A series of indentations 343 is provided between each subsequent set of radial end pairs to help an assembler to more easily manipulate the vertical translation and stabilization guide plate 189 to position it for insertion. A central aperture 345 is provided to accommodate and fit around the small boss 199.

Figure 8:
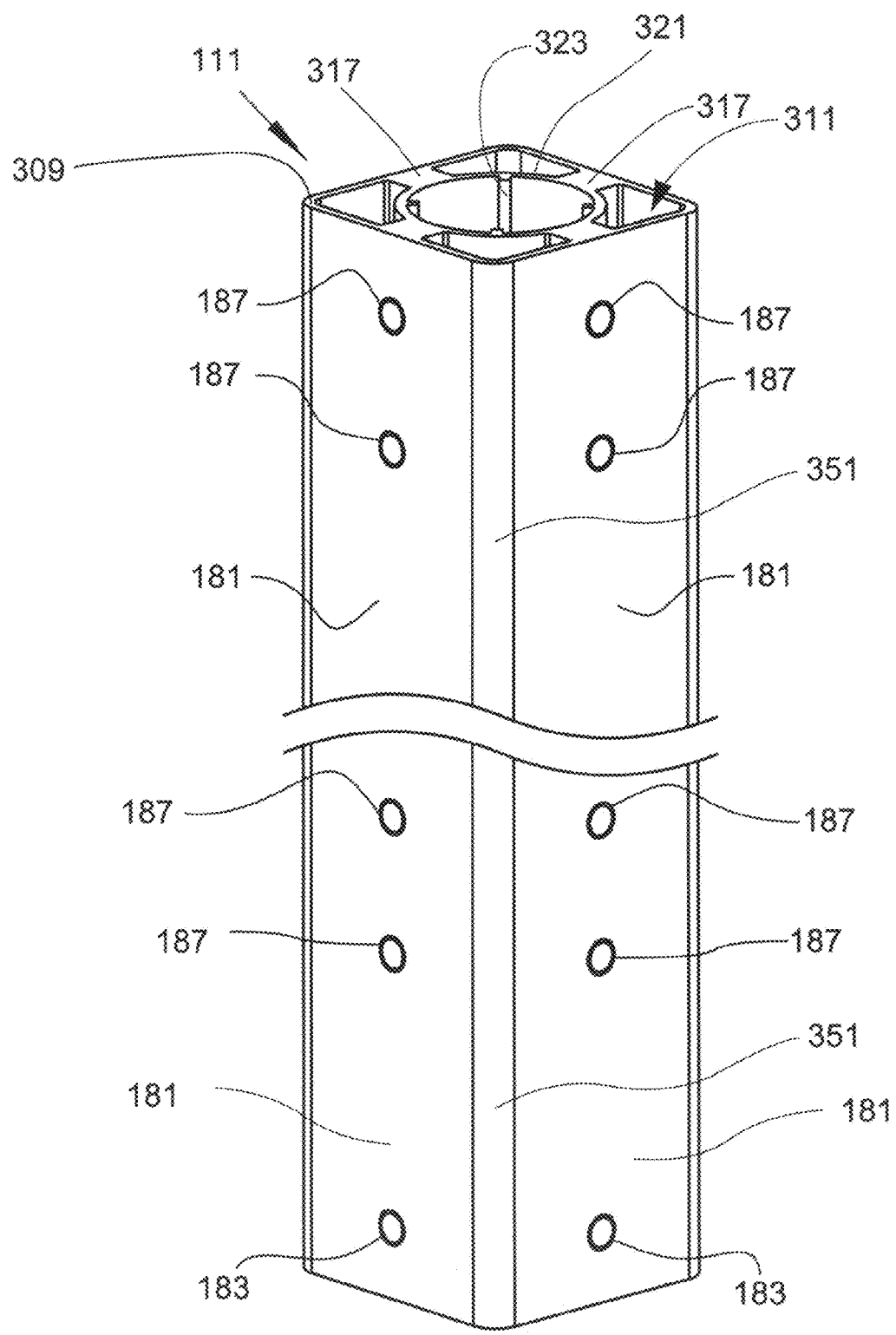
FIG. 8 is an upper perspective view of a vertically oriented post as was seen in FIGS. 1-3 and shown in an abbreviated fashion to emphasize the location and orientation of threaded bores used to attach brackets of horizontal cross members as well as the location of a threaded caster lock bore.

Referring to FIG. 8, an upper perspective view of a square post 111 as was seen in FIGS. 1-3 is shown in a broken fashion to emphasize the location and orientation of threaded cross member attachment bores 187 and threaded caster lock bore 183. It is understood that for a rectangular single support cell not having connection with other cross members 121, 125, 131, & 135, that each square post 111 may then be a corner post and will have its two adjacent flat sides 181 fitted with threaded cross member attachment bores 187. When a given square post 111 is part of more than one rectangular cell, it may carry threaded cross member attachment bores 187 on three or perhaps upon every one of its flat surfaces 181. In addition, it may carry more than one threaded caster lock bore 183, although only one is needed to secure a given caster assembly 145 within a single square post 111. Providing single square posts 111 with the ability for multiple intermediate levels of cross members in addition as cross members 121, 125, 131, & 135 simply means that more sets of threaded cross member attachment bores 187 would need to be provided a different levels. This is not to say that any cross member, such as cross members 121, 125, 131, & 135 must necessarily occupy a given level, but the attachment of any additional cross members 121, 125, 131, & 135 will contribute to the strength of any configuration of the table base 103.

In FIG. 8, a broken swath separates an upper portion of square post 111 having two pairs of threaded cross member attachment bores 187 on two adjacent flat sides 181. Flat sides 181 are separated by a brief curved surface as a curved transition 351 to help lessen injury from any inadvertent human contact with an otherwise sharp transition with a right angle corner that might otherwise exist between flat sides 181. The two pairs of threaded cross member attachment bores 187 on the upper portion of square post 111 are positioned high enough, as will be shown, to enable upper cross members 121 & 131 be generally even with the top of the square post 111 to provide more surface support area to a planar structure gathering support from the table base 103, such as top 105.

Conversely, in FIG. 8, the lower portion of square post 111 below the broken swath is also shown as having two pairs of threaded cross member attachment bores 187 on two adjacent flat sides 181, but the threaded bores shown below the broken swath represent the lowermost pairs of threaded cross member attachment bores 187 which would be expected to support the lower cross members 125 & 135. In the embodiment shown, some additional dimension is provided between the lowermost threaded cross member attachment bore 187 and the threaded caster lock bore 183 but there need not be significant spacing unless a square post 111 had threaded cross member attachment bores 187 on all four sides such that one of four threaded cross member attachment bores 187 might physically conflict with a threaded caster lock bore 183 due to a potential common proximity. Note that because bores 183 and 187 are at the center of any flat side 181, so that entry into the square post 111 will be at least partially into the material of the four supports 317 located between the outer wall 315 and the inner tube 321. Note that table 101 can be produced with a table base 103 without casters in a cubic shape, such as by using feet (not shown) attached to the end of the jacking thread member 191.

Figure 9:
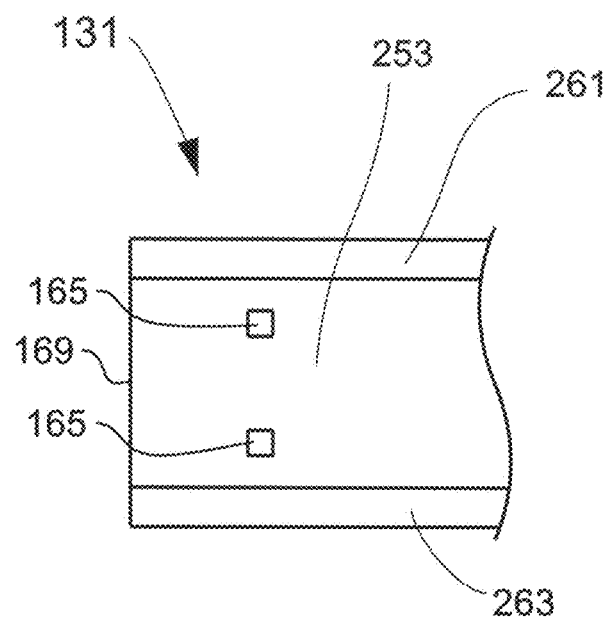
FIG. 9 is a side plan view taken along line 9-9 of FIG. 4 and looking into the inside of a cross member such that a third planar member is seen beyond the outer slot end walls and illustrating a vertical alignment for square punched holes generally possible with larger vertical clearances of larger cross members.

Referring to FIG. 9, is a side plan view taken along line 9-9 of FIG. 4 is a view looking into the inside and near the end of cross member 131, but in the embodiment of the sturdy lightweight table base 103 shown in the Figures with even sized cross members 121, 125, 131, & 135, the details of one end of cross member 131 will be the same as the details of all ends of the other cross members shown in FIGS. 1-9. The pair of square punched holes 165 are more clearly seen and arranged vertically with respect to the cross member 131, and parallel to the square-cut butt end 169. From the plan view looking into the open end between first and second outer slot end walls 261 and 263, the common wall 253 can be seen, but few other details.

Figure 10:
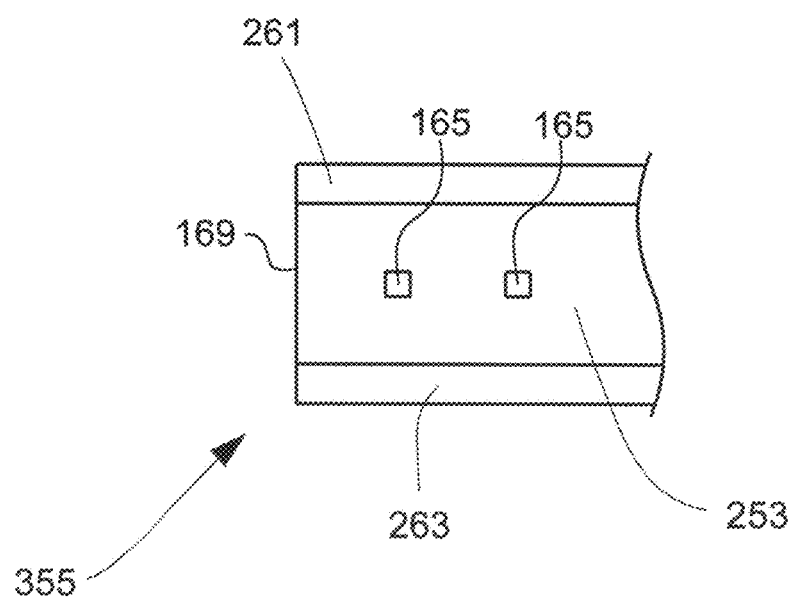
FIG. 10 is a side plan view similar to that seen in FIG. 9 and looking into the inside of a smaller, especially as to its vertical dimension, cross member than was seen in FIG. 9 and illustrating a horizontal alignment, that may be vertically centered, for square punched holes in order to provide access clearance.

Referring to FIG. 10, as an alternate example is a side plan view similar to that seen in FIG. 9 but illustrating a cross member 355 which may be smaller in width, but particularly in height, with respect to the dimensioning seen for cross member 131. A pair of square punched holes 165 is seen to be arranged horizontally with respect to the cross member 355, and parallel to the linear extent of the cross member 355. Where the vertical height of cross member, such as one of cross members 121, 125, 131, & 135, begins to be vertically reduced, a vertical alignment of square punched holes 165 would force a closer spacing of square punched holes 165 which is undesirable from an assembly tool interference standpoint. The arrangement of cross member 355 is simply one alternative embodiment that may be of advantage as cross member 355 size becomes smaller.

Figure 11:
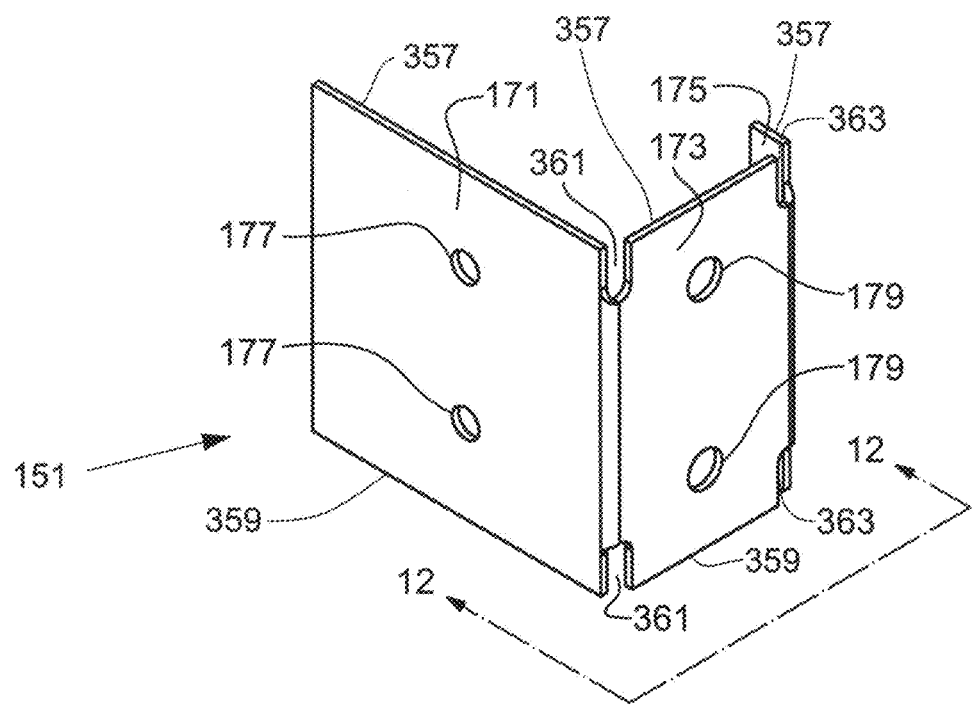
FIG. 11, is a perspective a view of the corner bracket seen in FIGS. 2 & 3 which has first and second planar members carrying securing apertures for attachment to the cross member of FIG. 9.

Referring to FIG. 11, a perspective view of the corner bracket 151 seen in FIGS. 2 & 3 is shown. Each of the corner brackets 151 has an overall "J" shape when viewed vertically and may preferably have a constant overall height. A first planar member 171 is used for inserting the corner bracket 151 into and adjacent the common wall 253 of the cross members 121, 125, 131, & 135. First planar member 171 is guided by first and second inner slot 267 & 273 of horizontal member 131 seen in FIG. 4. A second planar member 173 may generally be at a right angle to the first planar member 171 and may ultimately be located adjacent to the butt end 169 to lie opposite the square post 111 when cross member 121 is brought adjacent square post 111. Second planar member 173 is guided by inside portions of first and second walls 251 & 255 of horizontal member 131 seen in FIG. 4.

An abbreviated third planar member 175 extends from the second planar member 173, may generally be at a right angle to the second planar member 173 and may extend away from the second planar member 173 parallel to and in the same direction that the first planar member 171 extends from the second planar member 173. Abbreviated third planar member 175 is guided by first and second outer slot 277 & 283 of horizontal member 131 seen in FIG. 4.

First, second and third planar members 171, 173 & 175 may preferably be of the same height with each having an upper edge 357 and a lower edge 359. Even height enables all of the upper and lower edges 357 and 359 to fit within the cross members 121, 125, 131, & 135 with better and more extended support. The second planar member 173 upper and lower edges 357 and 359 are separate from the upper and lower edges 357 and 359 of planar members 171 and 175. A series of four notches that result from material removed predominantly considered from a face of second planar member 173, including a pair of notches 361 adjacent first planar member 171 and a pair of notches 363 adjacent third planar member 175. All of the notches 361 & 363 are of sufficient width to enable first and second inner slot walls 265 and 271 and first and second outer slot wall 275 and 281 to slide past when the corner bracket 151 is guidably inserted past its respective butt end 169 of one of the cross members 121, 125, 131, & 135.

Figure 12:
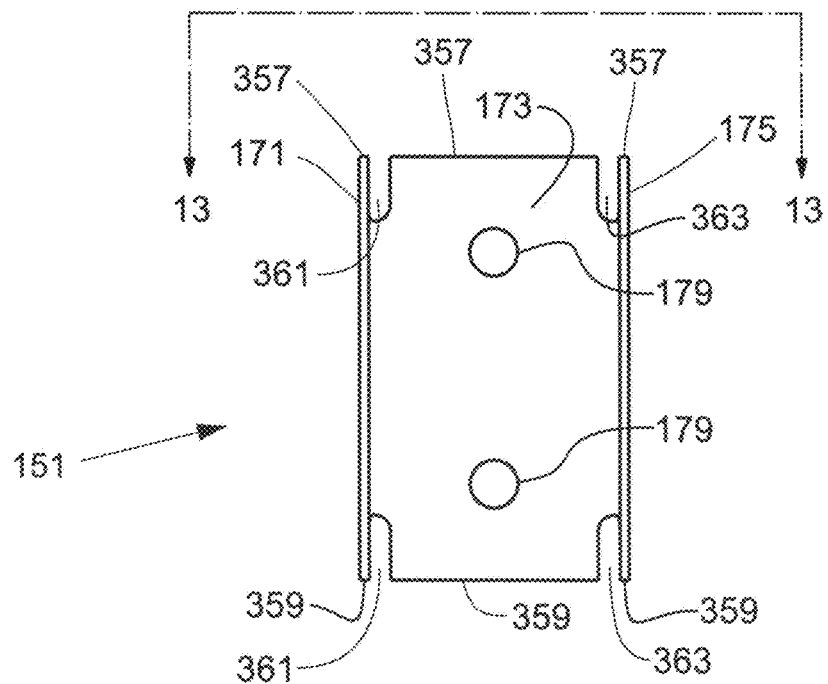
FIG. 12, is a view taken along line 12-12 of FIG. 11, which is a plan view of the corner bracket looking into second planar member which will oppose, and be slightly spaced apart from, but urged toward the surface of the vertical post of FIG. 8 when it is attached within and guided by structures of the cross member of FIGS. 1-4 & 9.

Referring to FIG. 12, a view taken along line 12-12 of FIG. 11, which is a plan view of the corner bracket 151 facing second planar member 173, illustrates a profile oriented to be inserted into one end of one of the cross members 121, 125, 131, & 135. The view of FIG. 12 best illustrates the openness of the notches 361 and 363 to provide clearances for the first and second outer slot walls 265, 271, 275 and 281 to be accommodated upon insertion of the corner bracket 151 into one end of one of the cross members 121, 125, 131, & 135.

Figure 13:
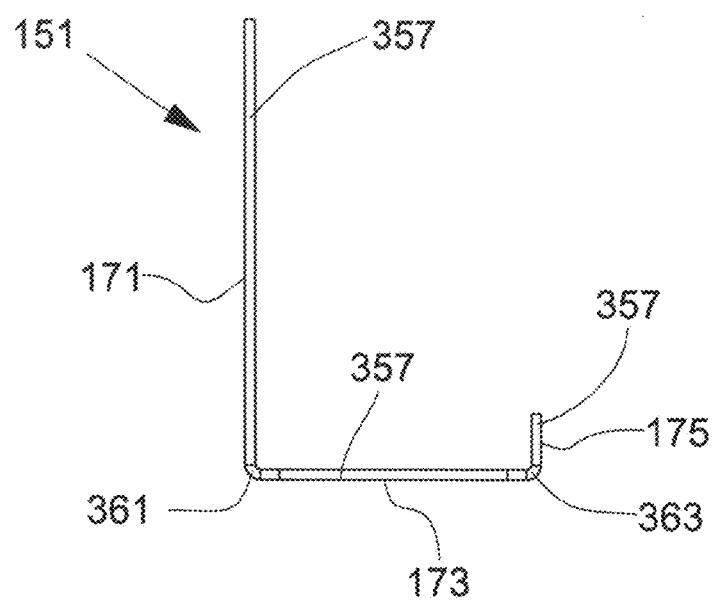
FIG. 13, is a view taken along line 13-13 of FIG. 12, which is a plan view looking down on the top of the corner bracket and illustrating the right angled relationship of preferably integrally formed first, second and third planar members.

Referring to FIG. 13, a view taken along line 13-13 of FIG. 12, is a plan view looking down on the top of the corner bracket 151 and illustrates the right angled relationship of preferably integrally formed first, second and third planar members 171, 173 and 175. However, the main concern for easy insertion into the cross members 121, 125, 131, & 135 is that the first, and third planar members 171 and 175 are parallel to each other so that they will facilitate insertion into and sliding translation and guided support within slots 267, 273, 277 and 283. First and second oppositely oriented inner slots 267 & 273 will guide portions of the first planar member 171 adjacent its supper and lower edges 357 & 359, while first and second oppositely oriented outer slots 277 and 283 guide portions of the third planar member 175 adjacent its supper and lower edges 357 & 359. First and Third planar members 171 and 175 are sufficiently parallel to be inserted within one end of one of the cross members 121, 125, 131, & 135 and guided to a position where the securing apertures 177 of corner bracket 151 align with the pair of square punched holes 165 to enable corner bracket 151 to be joined to its associated cross members 121, 125, 131, or 135.

Figure 14:
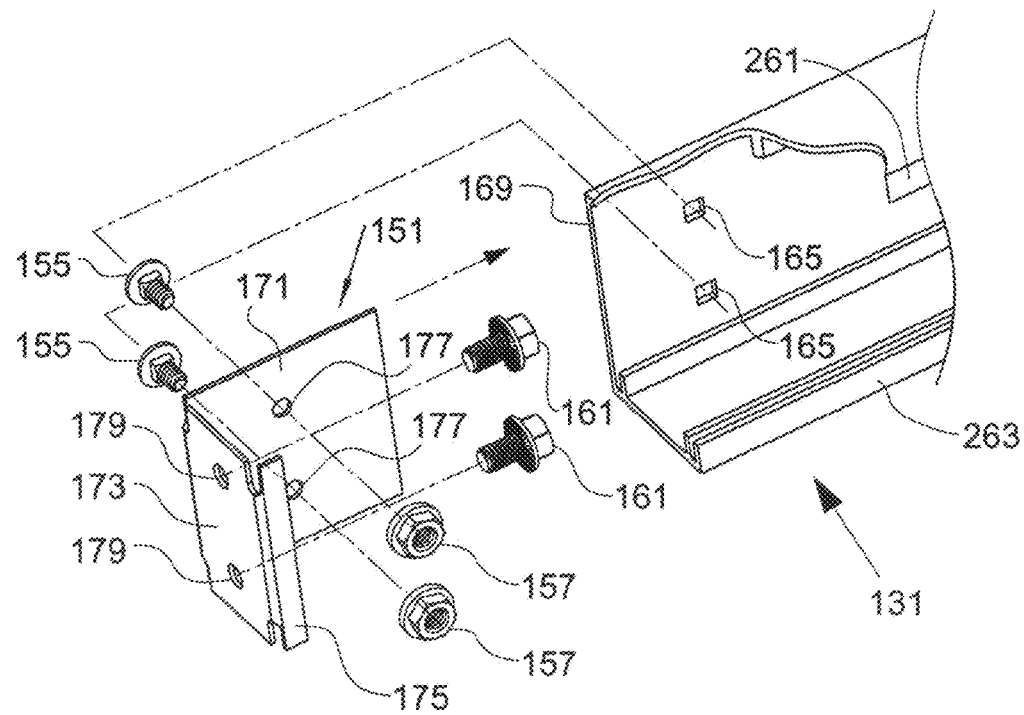
FIG. 14 is an expanded upper perspective view of a horizontally oriented cross member and bracket as was seen in FIGS. 2, 3, 4, 9, & 11-13 and shown in a position which facilitates an explanation of a portion of the process of assembly.

Referring to FIG. 14, an expanded upper perspective view of a horizontally oriented cross member 131 and corner bracket 151 as was seen in FIGS. 2, 3, 4, 9, & 11-13 is shown in a position which facilitates an explanation of a portion of the process of assembly. A preferred order of assembly involves an initial attachment of the corner bracket 151 to the cross member 131. First, the corner bracket 151 is oriented for movement toward one of the butt ends 169 of the cross member 131. First planar member 171 will enter the space between the first wall 251 and second wall 255 closest to the common wall 253, with the upper edge 357 and lower edge 359 of the first planar member 171 fitting within first and second oppositely oriented inner slots 267 and 273.

Further movement will then cause the third planar member 175 to enter the cross member 131. The upper and lower edges 357 & 359 of the third planar member 175 then lie closely adjacent the first and second walls 251 & 255, respectively. The upper edge 357 and lower edge 359 of the third planar member 175 will be guided into and fitting within first and second oppositely oriented outer slots 277 and 283.

Further movement of the corner bracket 151 into the cross member 131 will eventually cause the first and second inner slot walls 265 & 271, and the first and second outer slot walls 275 & 281 to move through the notches 361 and 363 respectively as the second planar member 173 passes the butt end 169 and enters within the cross member 131. The upper edge 357 and lower edge 359 of second planar member 173 then lies closely adjacent first and second walls 251 & 255, respectively. Further movement of the corner bracket 151 into the cross member 131 will cause the third planar member 175 to pass through and clear the butt end 169 fitting completely within the cross member 131. When the corner bracket 151 is only a short distance into the cross member 131, the securing apertures 177 of the first planar member 171 are set to align with the pair of square punched holes 165. Such alignment creates a slight inward displacement of the second planar member 173 with regard to the butt end 169 of the cross member 131 which may also be known as an inset.

After alignment of the securing apertures 177 and square punched holes 165, a pair of carriage bolts 155 is inserted through their respective square punched holes 165. The carriage bolts 155 by their design are rotationally locked with respect to the square punched holes 165 to eliminate the requirement to hold a wrench onto the outside of the common wall 253 when they are being secured by their respective flange nuts 157. Carriage bolts 155 have a smoother outer profile that tends to reduce the chances unwanted engagements with cords and any other objects that might be encountered around the table base 103.

The preferably locking pair of serrated flange nuts 157 are then tightened into place on their respective carriage bolts 155. It may be preferable to attach both of the brackets 151 to both ends of all of the cross members 121, 125, 131, & 135 before beginning further assembly of the table base 103. Once a corner bracket 151 is secured with respect to the cross member 131, that butt end 169 of the cross member 131 is ready to be attached to the square posts 111.

The insertion of the serrated locking flange head screws 161 into the cross member attachment bores 187 carried by one of the square posts 111 seen in FIG. 8, will be performed by manual or linear drive tool insertion into the area between outer slot end walls 261 and 263 of the cross member 131. A special flex drive tool may enable construction to proceed more rapidly. Serrated locking flange head screws 161 may preferably be inserted through the securing apertures 179 of the second planar member 173 of corner bracket 151 before the cross member 131 is brought into approach to a square post 111 for better visual and more controlled threaded start of the serrated locking flange head screws 161.

Figure 15:
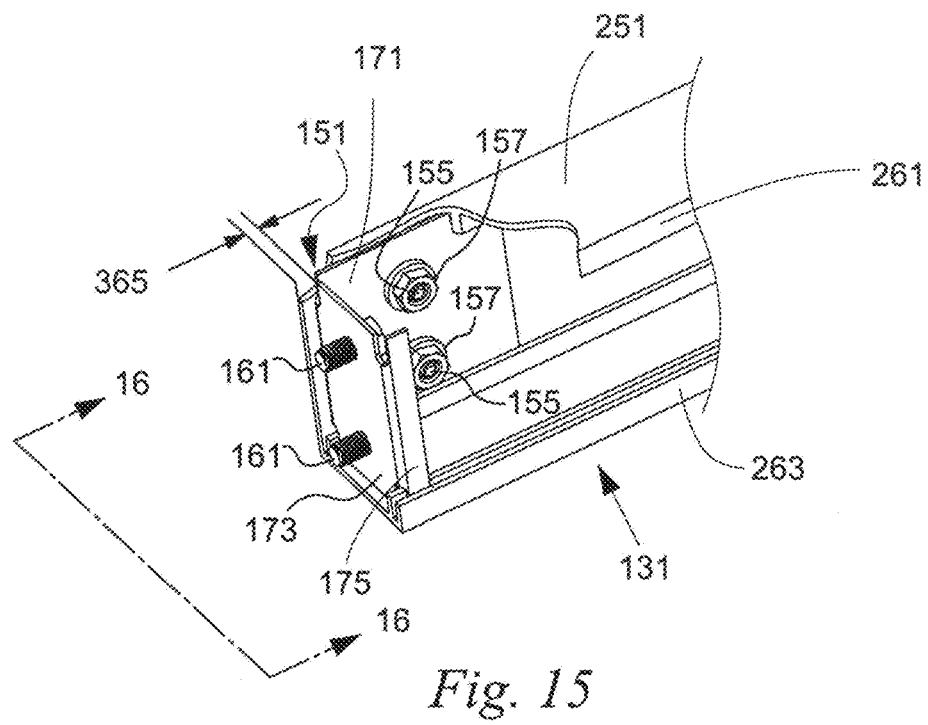
FIG. 15 is an expanded upper perspective view of the horizontally oriented cross member and bracket as was seen in FIGS. 2, 3, 4, 9, & 11-14 and similar to the orientation of FIG. 14 except that the component parts seen in FIG. 15 are assembled and without the presence of the vertical post of FIG. 8 which is not shown in order to avoid obscuring details.

Referring to FIG. 15, an expanded upper perspective view of the horizontally oriented cross member 131 and corner bracket 151 (as was seen in FIGS. 2, 3, 4, 9, & 11-14) is similar in orientation as FIG. 14 except that the component parts now seen in FIG. 15 are assembled. The vertical square post 111 of FIG. 8 which is not shown in order to avoid obscuring details. FIG. 15 also has a portion of the first wall 251 of the cross member 131 removed to give a more complete view of the attachment details in FIG. 15. The pair of flange nuts 157 are seen fastened onto the pair of carriage bolts 155. Note the limited access space between the outer slot end walls 261 and 263, and the closeness of the flange nuts 157 and carriage bolts 155 to the corner bracket 151.

Thus, FIG. 15 illustrates the position and extent of the manual insertion to a point of manual elimination of looseness that would be present if square post 111 (not shown in FIG. 15) were present. This view best illustrates an inset dimension 365 (shown by the a distance between oppositely oriented arrows) and which is the length to which the outside of the second planar member 173 is distanced from the a planar cut outer surface or edge of the butt end 169 of cross member 131. The magnitude of the inset dimension 365 that has been shown to work well with either a nominally sized three inch by two inch cross member 131 is about thirty to forty one-thousandths of an inch (approximately one millimeter). The choice of materials, dimensions and thickness for the corner bracket 151 may dictate a different inset dimension 365.

It is reminded that the butt end 169 is prepared by cutting in a plane orthogonal to an axis of the cross member 131 and that the end edges of the first and second walls 251 & 253, common wall 253, and inner and outer slot walls 265, 267, 271 & 273 and outer slot end walls 261 and 263 at butt end 169 are in the same plane, and provide surface area of contact with the flat surfaces 181 of the square post 111 (not shown in FIG. 15). The butt end 169 is the result of an easily formed right angled cut to a longer extrusion. Thus right angled accuracy can be obtained with the simplest of tools for cutting an extrusion to form the cross members 121, 125, 131, & 135 from a longer extrusion. The plane of the butt end 169 and the plane of the second planar member 173 is shown as having a parallel lateral orientation with respect to the lower edge of the second wall 255 of cross member 131.

Figure 16:
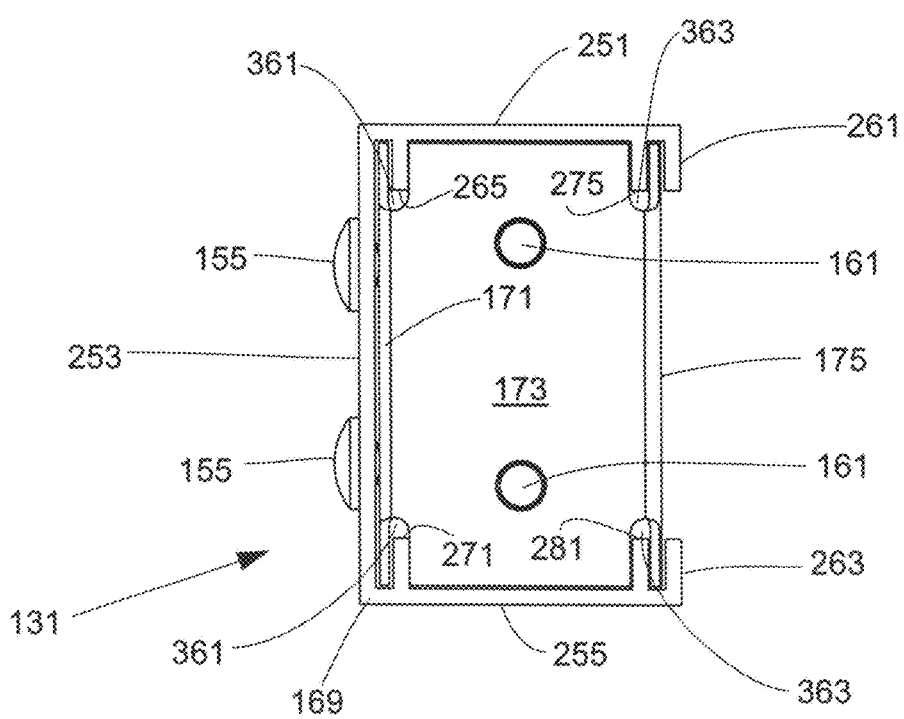
FIG. 16 is an end view of the assembled horizontally oriented cross member and corner bracket taken along line 16-16 of FIG. 15 and seen generally as combining the view of the horizontally oriented cross member of FIG. 4 with the view of the corner bracket similar to the view of FIG. 12.

Referring to FIG. 16, an end view of the assembled horizontally oriented cross member 131 and corner bracket 151 taken along line 16-16 of FIG. 15 is seen generally as combining the view of the horizontally oriented cross member 131 of FIG. 4 with the view of the corner bracket 151 similar to the view seen in FIG. 12. To the left, the carriage bolts 155 have a low profile with respect to the common wall 253. In the middle of the cross member 131, the relatively close fit and close guidance between the corner bracket 151 and the cross member 131 is readily observable, with any clearances seen being provided for illustrative purposes only. Force exerted on the back side of the second planar member 173 by the pair of serrated locking flange head screws 161 and toward the viewer observing FIG. 16 will be laterally controlled and guided depending upon the thicknesses, tolerances and materials provided for the corner bracket 151 and cross member 131.

FIG. 16 is a view which facilitates a further discussion of sizes. It is clear that the component parts of the table 101 and table base 103 can be made of any dimension from a miniature structure to an oversized structure. The dimensions that have been shown to work well for a table 101 that can be used as a work bench or utility table include a cross member 131 having sizes that may be conveniently based upon the 1924 American Lumber Standard (ALS) sizes to help increase the probability of interfitting with accessory structures that may also have been designed for compatibility with lumber.

Figure 17:
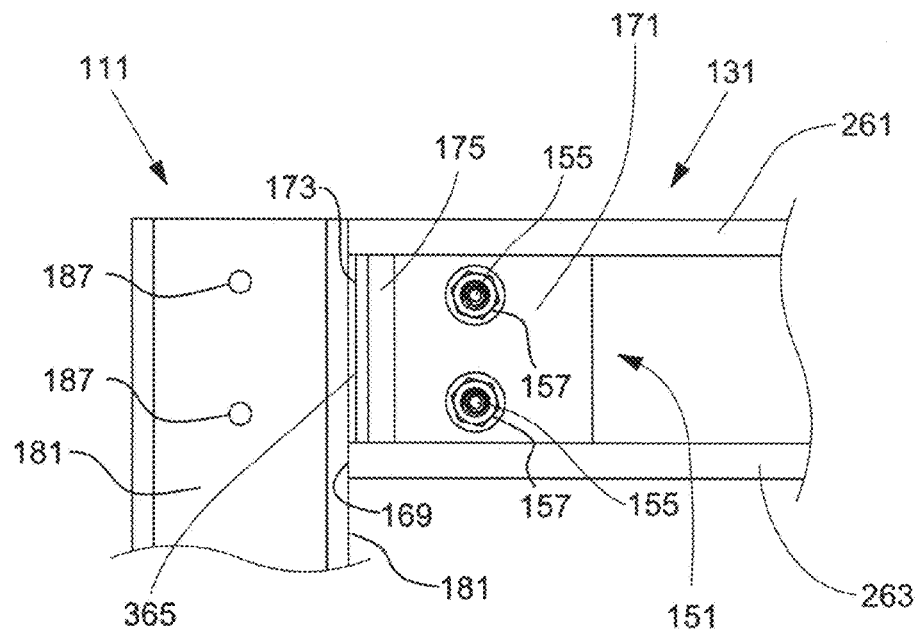
FIG. 17 is a side view looking into the inner side of a cross member just after the corner bracket is already attached with carriage bolts to the horizontal cross member and at the point in time when the horizontal cross member is brought into position with respect to the post so that the a butt end of the cross member contacts flat against a flat side of the post in anticipation of threaded flange head screws through the securing apertures for threaded engagement into threaded bores carried within the post.

Referring to FIG. 17 is a side view looking into the inner side of a cross member 131 just after the corner bracket 151 is already attached with carriage bolts 155 to the horizontal cross member using the flange nuts 157 and at the point in time when the horizontal cross member 131 is brought into an aligned position with respect to the square post 111. Bringing the horizontal cross member 131 into position so that the butt end 169 of the cross member 131 is near or contacts flat against the flat side 181 of the square post 111 in anticipation of threaded serrated locking flange head screws 161 (not seen in FIG. 17) being guided through the securing apertures 179 into attachment bores 187 of posts 111 will enable careful visualization of the threaded start.

Where a vantage point of FIG. 17 is possible, the threaded cross member attachment bores 187 and serrated locking flange head screws 161 can be in the space between second planar member 173 and the square post 111. Other advantages will have a narrower view between the butt end 169 of the cross member 131 and the square post 111. The serrated locking flange head screws 161 are not seen in FIG. 17 for clarity, which configuration may also be consistent with guiding the horizontal member 131 and its corner bracket 151 threaded engagement with the square post 111 before insertion of the serrated locking flange head screws 161 through the securing apertures 179, another sequential possibility for steps of assembly.

Hand tightening, and without further tightening, the second planar member 173 would be in a position as seen in FIG. 17 and still include an open inset dimension 365. The purpose of such inset dimension 365 is to provide a space within which the second planar member 173 may be urged in a direction toward an associated square post 111 to which the second planar member 173 is to be attached. The strength of connection may be obtained by urged force displacement of the second planar member 173, with or without various forms of deformation and bending of second planar member 173. If pairs of serrated locking flange head screws 161 were to be present in FIG. 17, they could be seen in the view of FIG. 17 crossing the inset dimension 365. The view of FIG. 17 is that of an uppermost cross member 131 that is engaged even and flush with the top of square post 111. This enables an extended area structural support surface available to an upper structure, such as planar top 105 or other structure.

Figure 18:
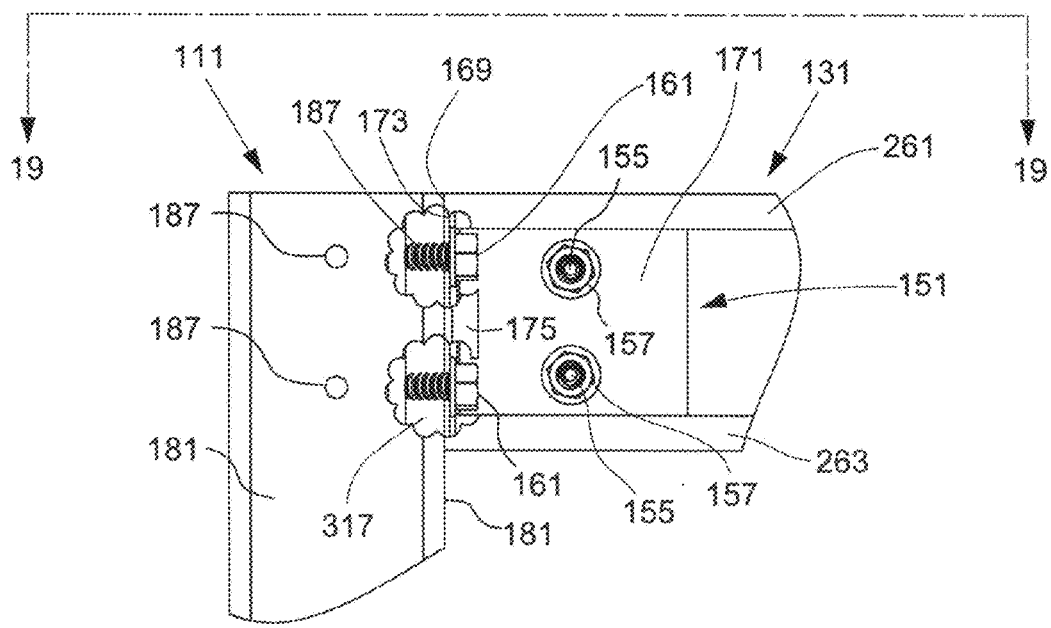
FIG. 18 is a view similar to that seen in FIG. 17 that illustrates a narrowing of the gap as the flange head screws urge the second planar member of the corner bracket and the horizontal member to which it is attached forward toward the flat side of the post.

Referring to FIG. 18, a view similar to that seen in FIG. 17 illustrates the presence of serrated locking flange head screws 161 and their being tightened to urge a portion of second planar member 173, typically on the side most closely adjacent third planar member 175 to a position where it appears to visually eliminate the inset dimension 365 when seen from the viewpoint of FIG. 18. In practice, and depending upon the choice of materials for the corner bracket 151, and also depending upon recommended torque for the serrated locking flange head screws 161 within the threaded cross member attachment bores 187, the displacement of the second planar member 173 toward the square post 111 may sometimes occur to a lesser extent than that shown in FIG. 18.

In any event, a springing force pulls the upper cross member 131 toward the square post 111 once the serrated locking flange head screws 161 are tightened beyond the force created with simple unaided finger tightening. Beyond finger tightening, each turn of the serrated locking flange head screws 161 urges the second planar member 173 toward the square post 111 perhaps until the side of the second planar member 173 on the side most closely adjacent third planar member 175 makes contact with the square post 111. Up to this tightness, the force is expected to be obtained by springing force perhaps little or no significant force by deformation.

Once the corner between the second and third planar members 173 & 175 makes contact with the square post 111, Further tightening may begin deformation, and thus may begin to fold a portion of the second planar member 173 at an area between its initial contact with the square post 111 and the portion of the planar member 173 adjacent the securing apertures 179. This may continue until the side of the second planar member 173 most closely adjacent third planar member 175 makes flat contact with the square post 111. It is during the aforementioned deformation action that further tightening may also begin to pull and slightly stretch the portion of the second planar member 173 on the side most closely adjacent first planar member 171. Such pulled stretching also operates against the first and second inner slot walls 265 & 267 as the second inner slot wall 271 makes an angular shape between the securing apertures 179, and the first planar member 171.

Figure 19:
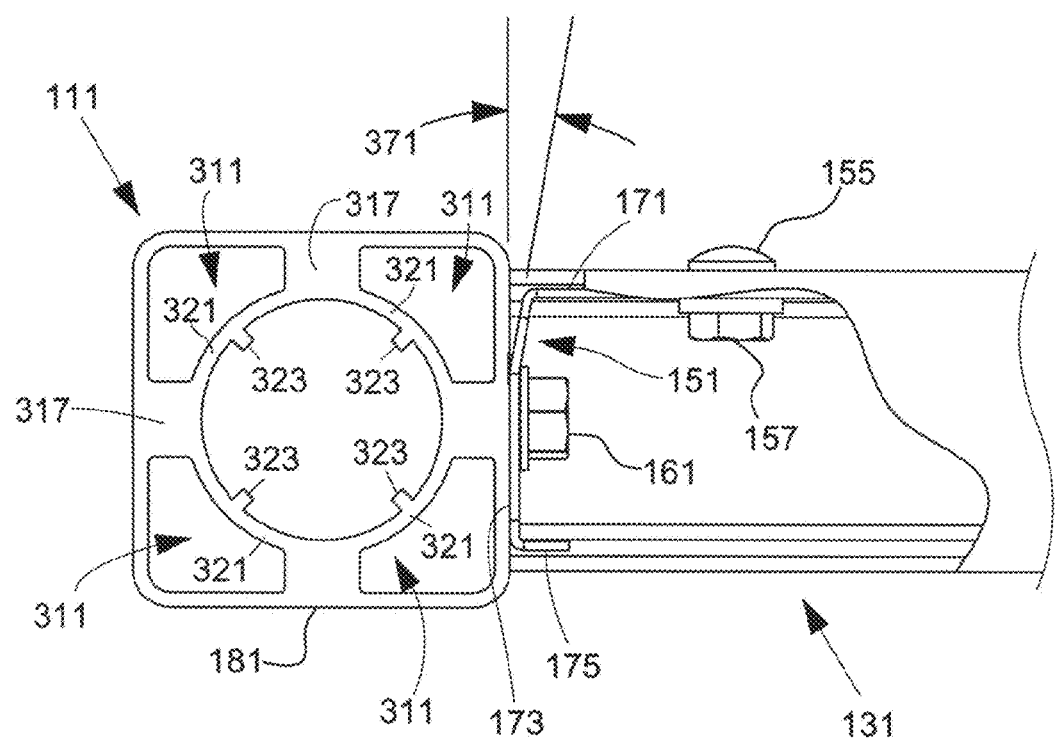
FIG. 19 is a plan view looking down along line 19-19 of FIG. 18 and illustrating the shape of the second planar member of the bracket after deformation due to tightening of the threaded flange head screws through the securing apertures of the second planar member of the bracket and into tightened threaded engagement into threaded bores carried within the post.

Referring to FIG. 19, a plan view looking down along line 19-19 of FIG. 18 illustrates the shape of the second planar member 173 of the corner bracket 151 after deformation due to tightening of the threaded serrated locking flange head screws 161 through the securing apertures 179 (not shown in FIG. 19). The second planar member 173 is more clearly shown as having a flat portion adjacent the third planar member 175 and an angled, possibly stretch or tension portion adjacent the first planar member 171.

The mechanisms of deformation of the of the second planar member 173 may vary widely depending upon materials and their thicknesses. The tension action may also depend upon the ability of the first and second inner slot walls 265 & 267 to constrain the first planar member 171.

Note that along the width of the area of the second planar member 173 between the serrated locking flange head screws 161 and the corner between first and second planar member 171 & 173 that there is very little room for deformative "give", assuming that the first and second inner slots 267 & 273 are able to continue to guide and constrain the first planar member 171. What may occur is a combination of a tension and a clamping pull by the serrated locking flange head screws 161. The angular bend between the first and second planar member 171 & 173 may also contribute to the force of pull of the horizontal cross member 131 toward the square post 111. To the extent that it may be characterized based upon some of the dimensions disclosed, an angle 371 as seen in FIG. 19 may be between about five and ten degrees. However, much will depend on the size of the cross member 131, the thickness and materials of the corner bracket 151, and the inset dimension 365, to name a few.

Figure 20:
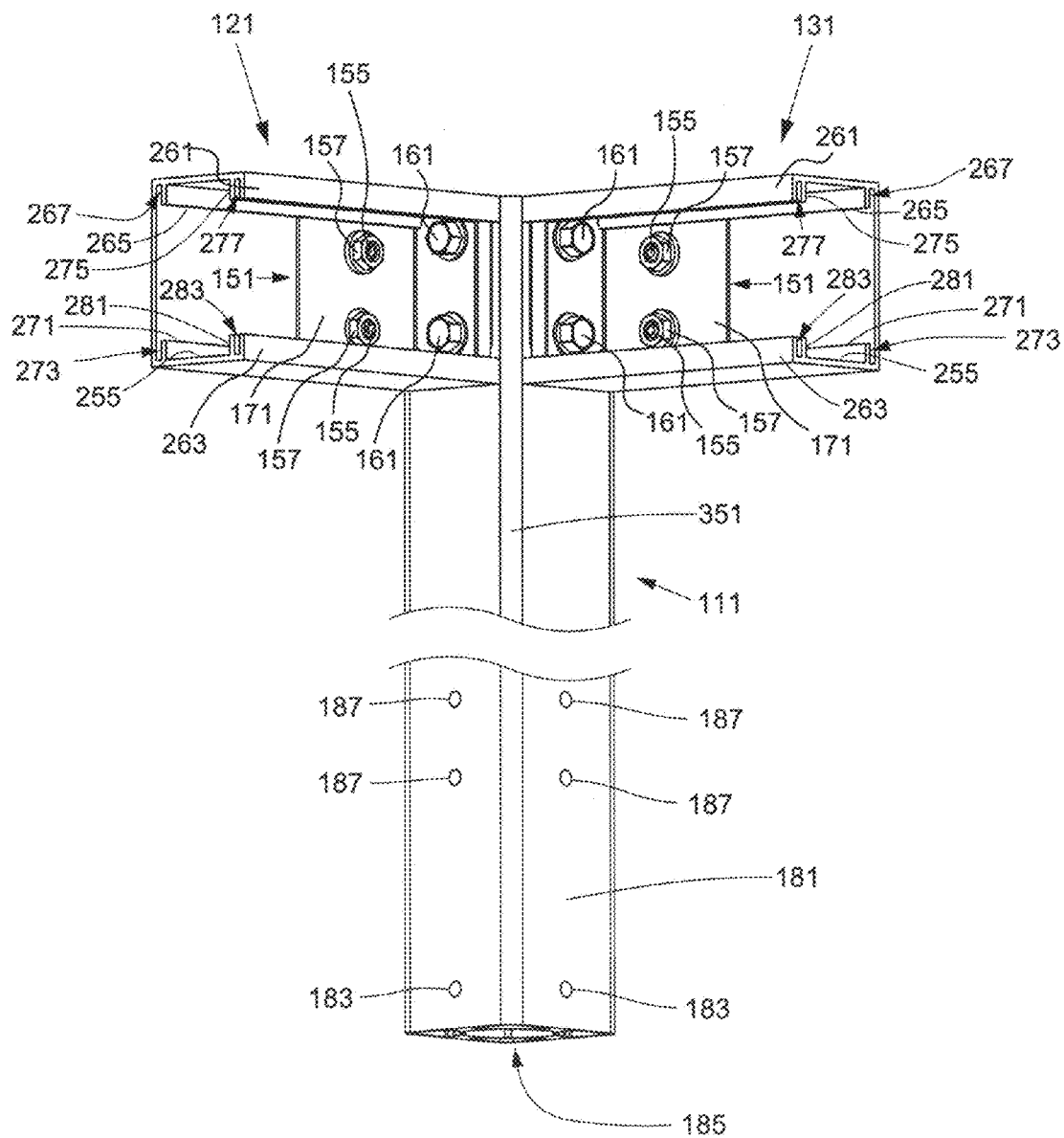
FIG. 20 is a perspective view into an inside corner of a post having two horizontal cross members attached to a vertical post at the same level.

Referring to FIG. 20, a perspective view into an inside corner of a square post 111 having longer upper cross member 121 and the shorter upper cross member 131 attached to a vertical square post 111 at a same vertical height is shown. As can be seen, access to the serrated locking flange head screws 161 for either of the cross members 121 or 131 is facilitated despite the close proximity of the cross members 121 and 131. FIG. 20 is a first partial illustration giving an appreciation of the symmetry of components that make up table base 103. FIG. 20 also provides a visual emphasis of the independence and non-interference that any two of the cross members 121, 125, 131, 135 have with respect to each other upon their attachment to square post 111. Although only one additional level of support for cross members 121 & 131 is shown, several heights of horizontal cross member support can exist on a given square post 111 and the cross members 121, 125, 131, & 135 and more need not be at the same height as each other, especially where other accessories could benefit from different heights of a number of cross members such as cross members 121, 125, 131, & 135.

Figure 21:
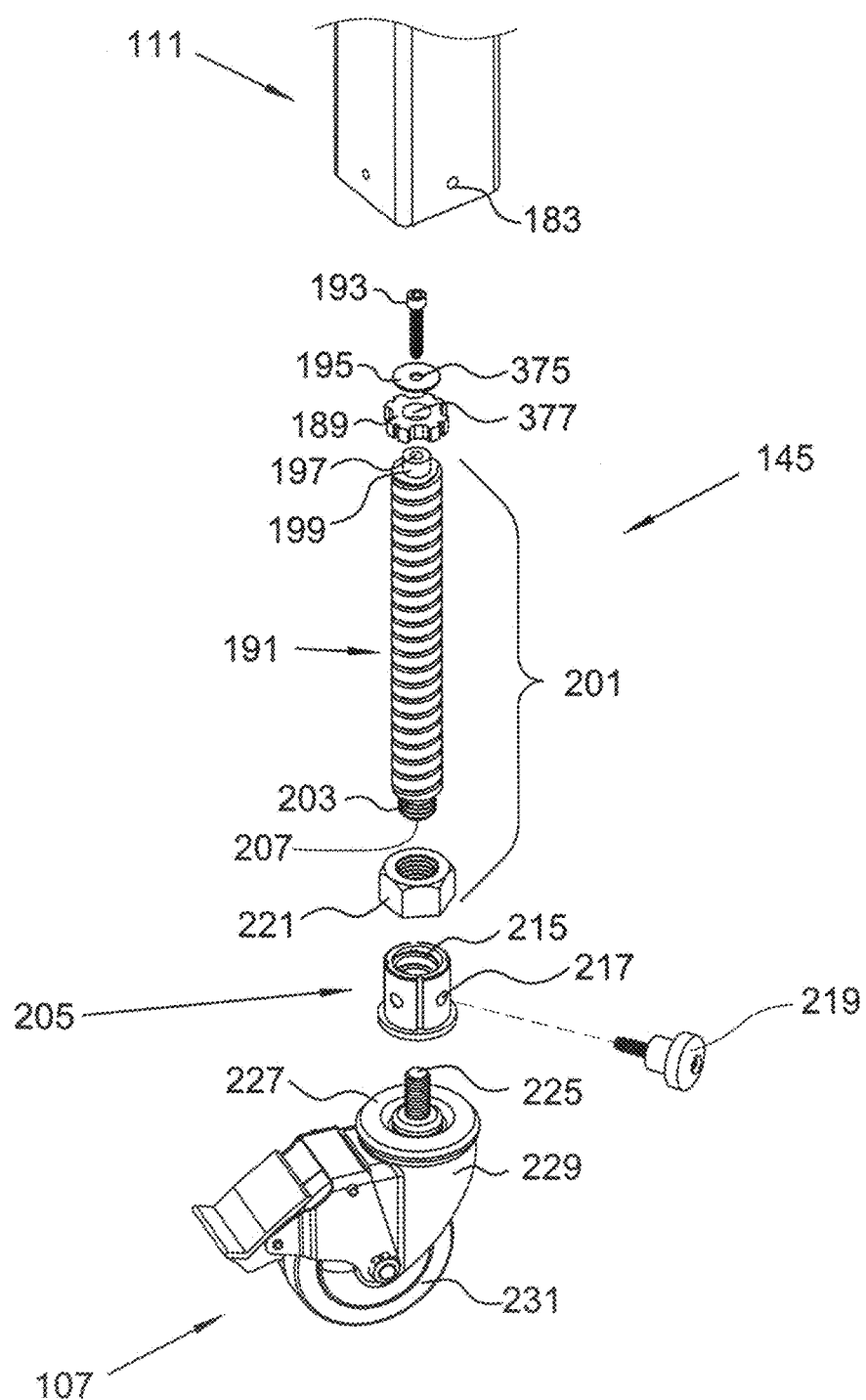
FIG. 21 is an expanded perspective view of the exploded components of the wheel assembly shown in FIG. 3.

Referring to FIG. 21, a further expanded perspective view of the exploded components of the wheel assembly 145 shown in FIG. 3 is seen. In addition to the structures identified in FIG. 3, an aperture 375 is seen in washer 195. Washer 195 enables the threaded member 193 to project a larger diameter securing force to hold the vertical translation and stabilization guide plate 189 around the small boss 199 through a bore 377 that accepts the small boss 199. The height adjustment nut 221 is shown adjacent the smaller diameter thread set 203. It will facilitate visualization of interfit with the smaller diameter thread set 203, even though upon assembly the fixed operation of the height adjustment nut 221 and the smaller diameter thread set 203 from which it depends will be below the load flank nut 205. The larger diameter height adjustment nut 221 will also help to limit the extent to which the main load flanked thread 201 can pass upwardly through the load flank nut 205.

Figure 22:
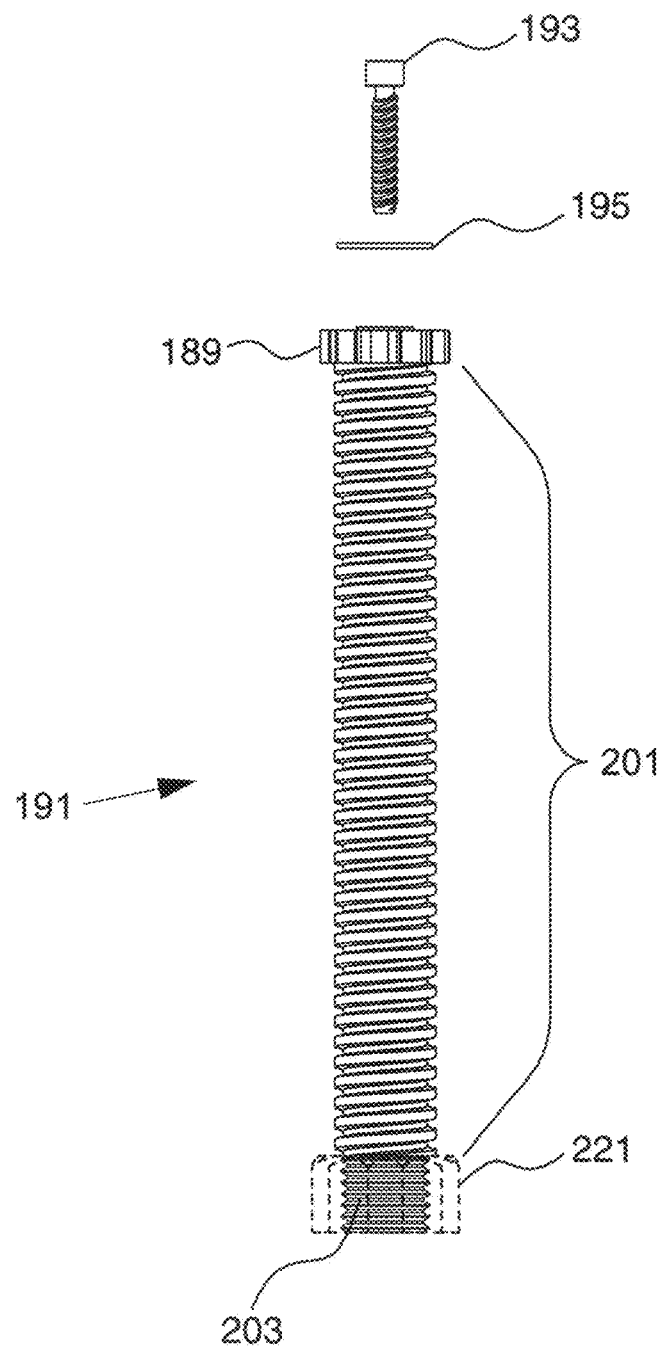
FIG. 22 is a further expanded plan view of the partially assembled jacking thread member with the stabilization guide plate in place.

Referring to FIG. 22, a further expanded plan view of the partially assembled jacking thread member 191 with the threaded member 193 is shown in a position to engage washer 195 and to be threadably inserted into the small upper threaded bore 197 (not seen in FIG. 22). The threaded member 193 will bring the washer 195 in place against the vertical translation and stabilization guide plate 189 to hold it in place. The height adjustment nut 221 is shown in phantom to better illustrate the smaller diameter thread set 203.

Figure 23:
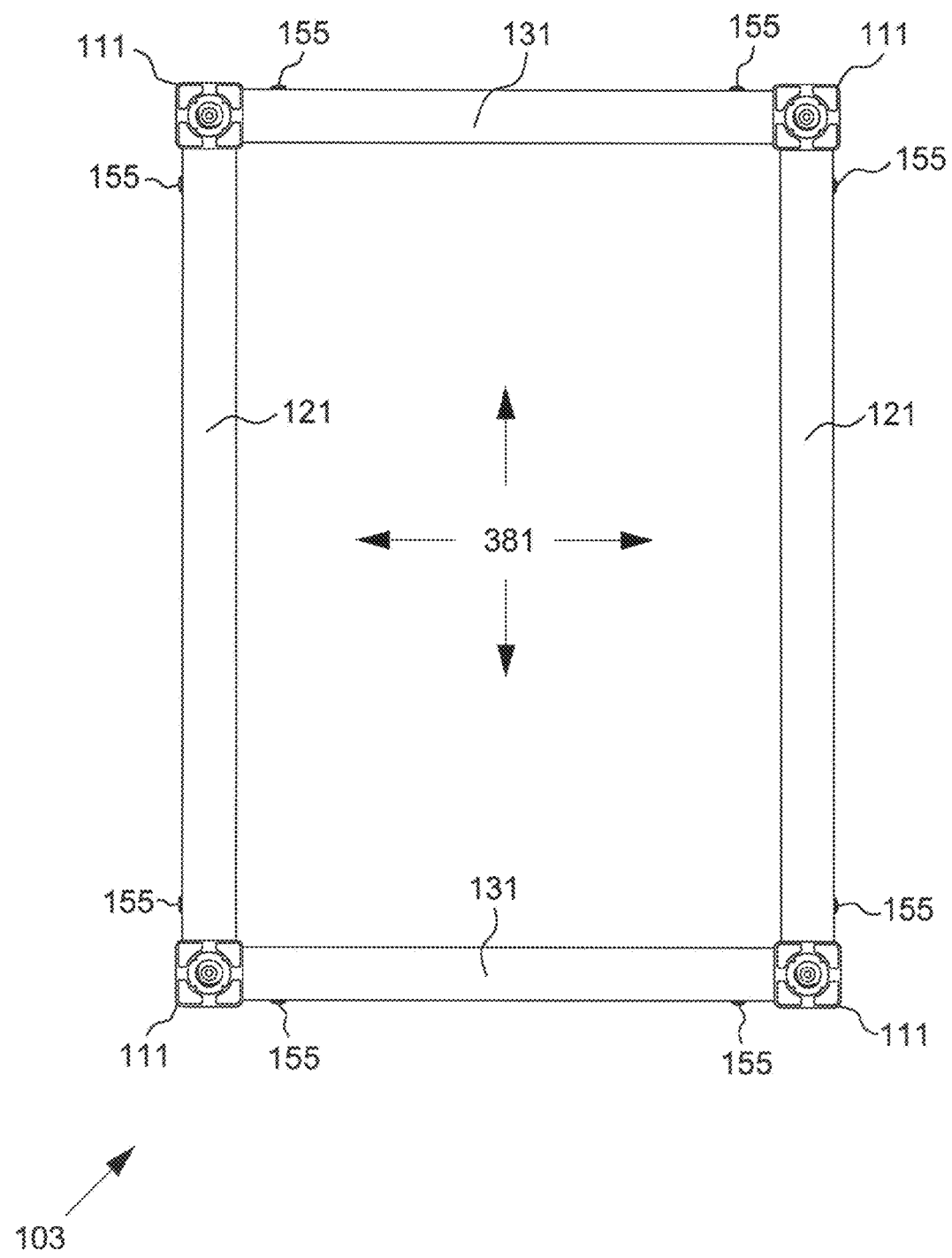
FIG. 23 is a view looking down upon the rectangular structure of the table support in an assembled condition similar to that shown in FIG. 1, but with the plain planar top not shown and with the wheel assemblies not shown in order to provide an unfettered expanded plan view of the resulting cell formed from the upper horizontal cross members which may or may not be identical in cross sectional dimension but the same length as any set of horizontal cross members lying below.

Referring to FIG. 23, a view looking down upon the rectangular structure of the assembled table supports in an assembled condition similar to that shown in FIG. 1, but with the plain planar top 105 not shown and with the wheel assemblies 145 not shown in order to provide an unfettered expanded plan view of a basic resulting cell. The longer upper cross members 121 and shorter upper cross members 131 are each shown as having a pair of ends connected to the vertical posts 111. Any pressure diagonally from one square post 111 to its diagonal opposite will create an opening or widening force that will be resisted by a resistance to widening of the two diagonally located posts. The other set of diagonal posts will simultaneously resist closing or narrowing. These two sets of stable resistive forces will make a resulting horizontal rectangular cell structure 381 very strong.

It is understood that the horizontal rectangular cell structure 381 shown is only a top view illustrating the upper cross members 121 & 131. Other cross members 125 & 135 and other possible cross members at a lower level (not shown) can be placed to further strengthen other rectangular cell structures 381. A given closed rectangular cell structure 381 may be able to provide greater strength of all the members 121 and 131 if located at the same level, but as before, location at a same vertical level need not be required. Where different levels of the cross members 121 and 131 occur, the strength of the posts 111 should be sufficient to withstand any torsional effects from their availability to act at different vertical levels through vertical lengths of the posts 111 through which they act. In the table base 103 shown in the figures, two such given closed rectangular cell structures 381 occur.

Figure 24:
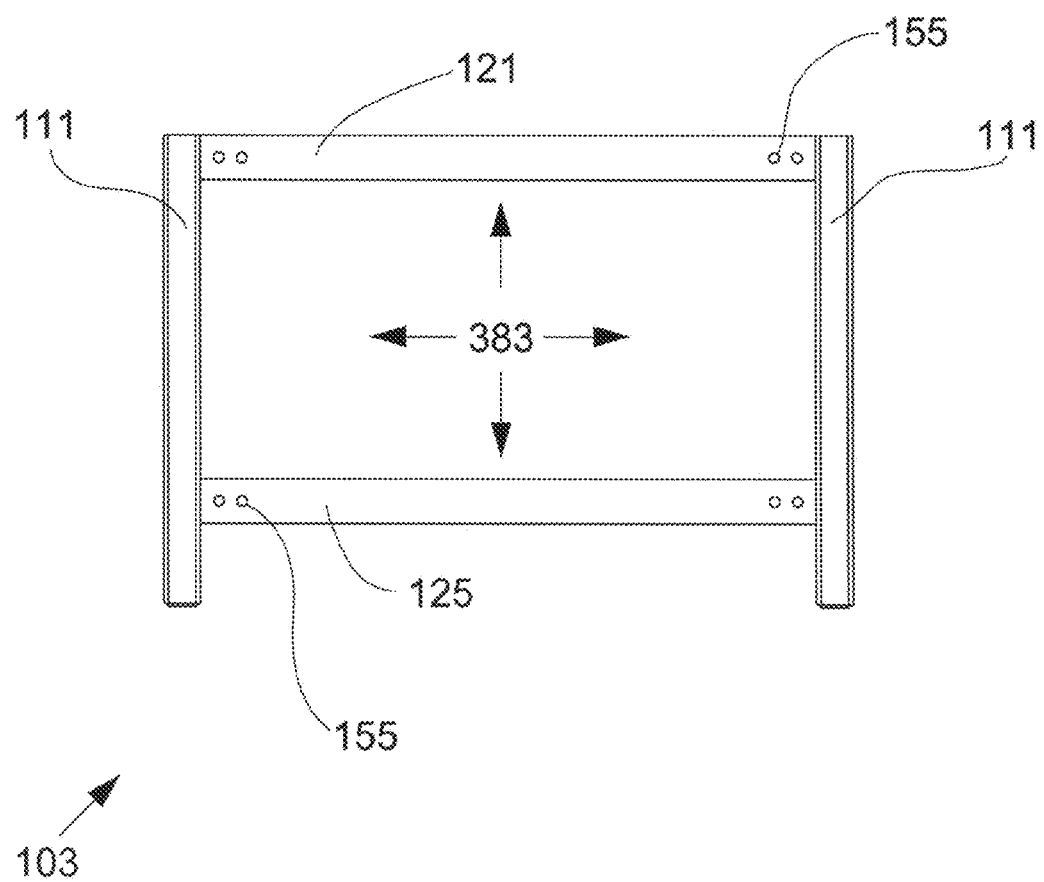
FIG. 24 is a side plan view looking into a rectangular structure of the upper and lower cross members and two attached square posts to form a closed vertical rectangular structure of the cell table support seen in an assembled condition similar to that shown in FIG. 1, but with the plain planar top not shown in order to provide an unfettered expanded plan view with cross members and square posts which may or may not be identical in cross sectional dimension but the same length as any set of horizontal cross members lying beyond.

Referring to FIG. 24, a side plan view looking into a closed vertical rectangular structure 383 formed by upper and lower cross members 121 & 125 and two attached square posts 111 is shown. For an upper and lower closed horizontal rectangular cell structure 381 (one of which was seen in FIG. 23) four closed vertical rectangular structures 383 will be present (only one of which is seen in FIG. 24). Thus, the combination of the two, vertically separated, horizontal closed rectangular cell structures 381 and the four closed vertical rectangular structures 383, formed by a given single table base 103, synergize to form a very strong structure that can provide exacting support that can be used in a high precision environment and enables production of an extremely sturdy table 101.

Figure 25:
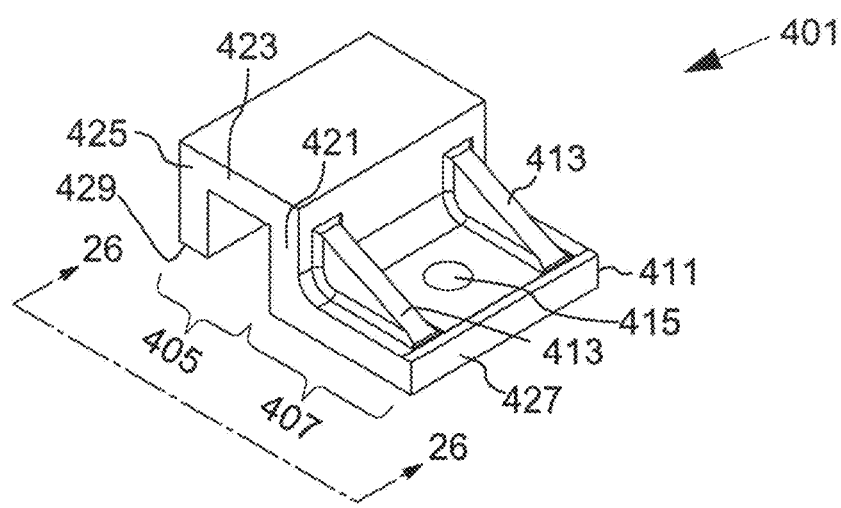
FIG. 25 is a perspective view of one possible realization of an attachment bracket for securing the table top seen in FIG. 1, to an upper horizontal cross member.

Referring to FIG. 25, a perspective view of one possible realization of an attachment bracket 401 for securing the table top 105 to a table base 103 both seen in FIG. 1, is shown. More directly, the attachment bracket 401 will attach the table top 105 to an uppermost, adjacent horizontal cross member 121, 131. Attachment bracket 401 has a cross member engagement portion 405, and a table top engagement portion 407. The table top engagement portion 407 that includes a plate 411 that may be integrally formed with a pair of spaced apart inclined structural supports 413 that strengthen the support between the cross member engagement portion 405 and table top engagement portion 407. The plate 411 may have one or more apertures 415 to facilitate threaded engagement of the plate 411 to another structure such as the underside of the plain planar top 105.

The table top engagement portion 407 as viewed laterally includes a first wall 421 that may be formed integrally with the plate 411 and is further enforced with the connectivity of the spaced apart inclined structural supports 413. A second wall 423 may be formed integrally with first wall 421. A third wall 425 may be formed integrally with the second wall 423. As can be seen, plate 411 and the first, second and third walls 421, 423, & 425 may or may not have a relative similar thickness. When formed integrally, the structures extend from a first end 427 at a non-attached end of plate 411 opposite the first wall 421, and extending to a second end 429 at the non attached end of the third wall 425 opposite attachment to the second wall 423.

First, second and third walls 421, 423, & 425 laterally viewed, may have an unbalanced "U" shape, with the third wall 425 having a shorter extent, terminating at second end 429 in order to accommodate the thickness of the first wall 251 of the uppermost cross members 121 & 131, as seen in FIG. 4. The space within the First, second and third walls 421, 423, & 425 should also provide clearance for fitting around the outer slot end wall 261 and second outer slot wall 275. In order that the planar top 105 fit securely and to be the least moveable with respect to the table base 103, the structures of engagement on the attachment bracket 401 may vary.

For example, an attachment bracket 401 may be sized to interfit with any structural details of the upper opening of the upper cross members 121 and 131 for stabilization by the upper cross members 121 and 131 as well as a pre-selected bearing engagement. Second end 429 may be set to bear against the first wall 251 of the uppermost cross members 121 & 131 or to simply provide clearance. Second wall 423 can be set to bear against the lowermost ends of the outer slot end wall 261 and first outer slot wall 275 of the cross members 121 & 131 for a snug fit. Further the plane of the plate 411 may have an angle slightly greater than a right angle with respect to the plane of first wall 421 so that some tension may be applied by second wall 423 and/or the second end 429 to any structure of the cross members 121 & 131 once the plate 411 has a strength attachment to the bottom of the plain planar top 105. Many other variations in the design and formation of the attachment bracket 401 are possible.

Figure 26:
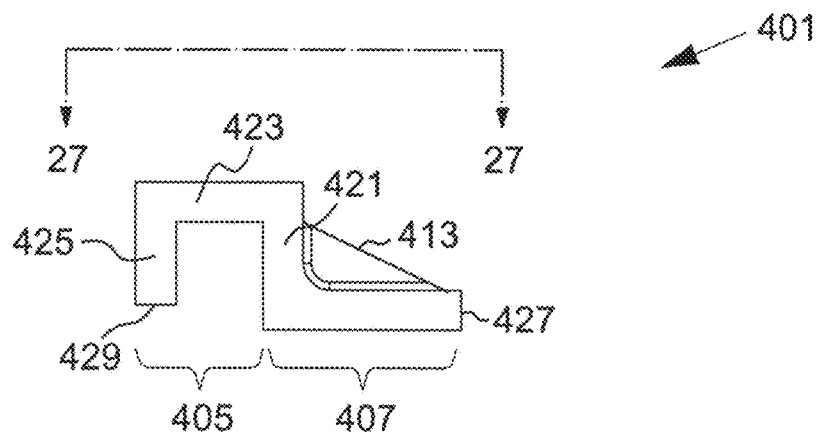
FIG. 26 is a side view of the attachment bracket of FIG. 25, taken along line 26-26 of FIG. 25.
Figure 27:
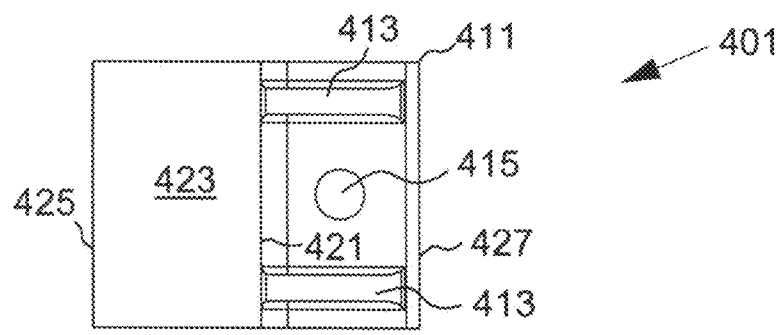
FIG. 27 is top plan view of the attachment bracket of FIGS. 25 and 26, taken along line 27-27 of FIG. 26.

Referring to FIG. 26, a side view of the attachment bracket 401 of FIG. 25, taken along line 26-26 of FIG. 25 illustrates the overall lateral shape of the attachment bracket 401. Referring to FIG. 27, a top plan view of the attachment bracket 401 of FIGS. 25 and 26, taken along line 27-27 of FIG. 26 illustrates the simplicity of the basic structure of bracket 401 and contemplates that larger brackets made of a greater extent with longer lateral width with multiple apertures 415 and additional structure. A multiple attachment, longer plate (not shown) which may be possibly made of repeating units of the attachment bracket 401 can be employed where it is known that a greater holding strength is needed with less handling of the individual units of attachment bracket 401 of FIGS. 24-26.

Figure 28:
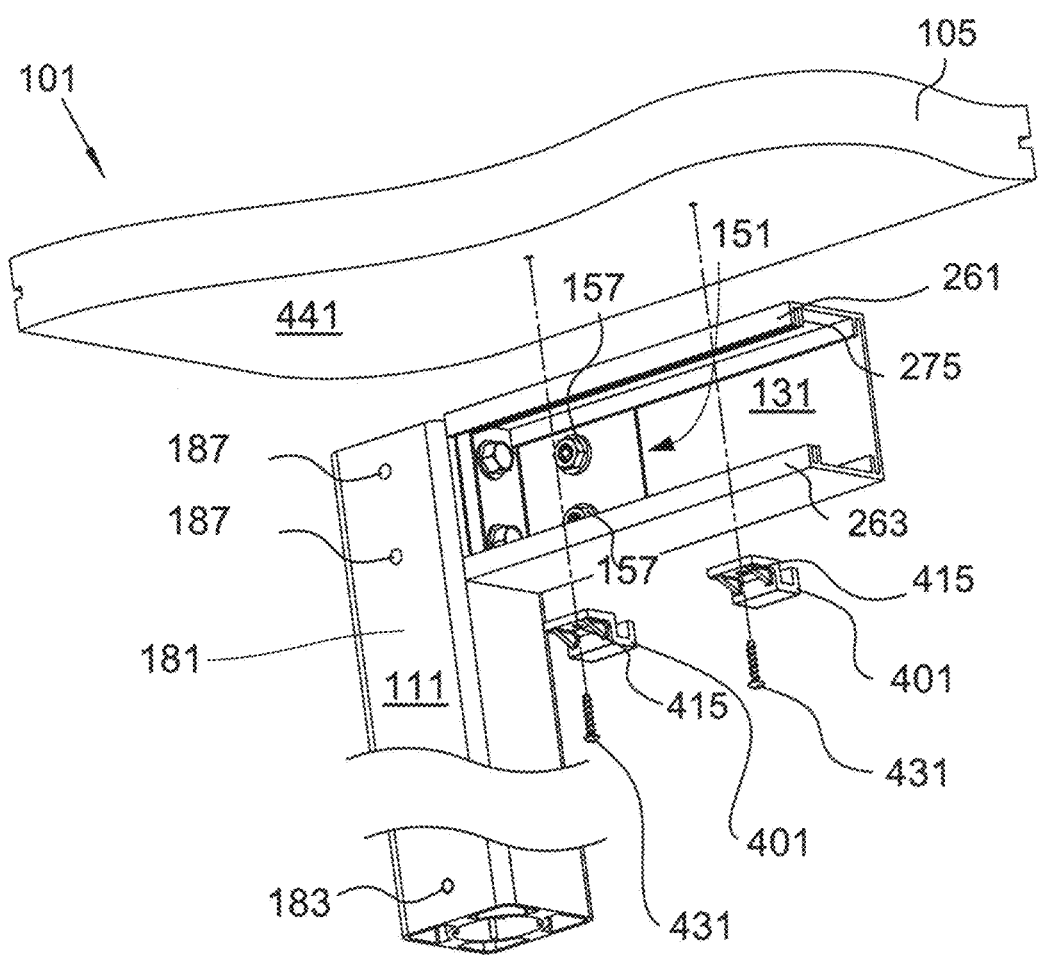
FIG. 28 is an exploded view of an underside perspective arrangement illustrating a corner post with exploded views of an overhead tabletop, attachment brackets and threaded members in a position to attach the table top using the bracket of FIGS. 25-27.

Referring to FIG. 28, an exploded view of an underside perspective arrangement illustrating a square post 111 with exploded views of an overhead tabletop 105, attachment brackets 401 and threaded members 431 in a position to attach the table top 105. One possible advantage in facilitated quick attachment might provide for table top 105 to be inverted and laid flat while the table base 103 rests upon it. In this orientation, the attachment brackets 401 distributed and easily attached to the table base 103 using power tools to rapidly engage the threaded members 431.

The table base 103 can be used with any top that has a flat or otherwise compatible underside. Other top structures, such as table top 101 can achieve attachment both with the attachment bracket 401 as well as other structures. Table 101 provides significant advantage for use with a plain top, including an expanse of plywood, metal plate material, sheet wood or individual lengths lumber having a significant flat underside surface. In FIG. 28, a top 105 is seen as having a flat underside surface 441. An adjacent upper cross member 121 has been removed for clarity and focus. Once the positions of the table top 105 and table base 103 are located with respect to each other as desired, an attachment bracket 401 is brought to a position over the outer slot end wall 261 and second outer slot wall 275. The threaded member 431 can be inserted through the aperture 415 and into the underside surface 441 of the top 105. As many of the attachment brackets 401 as desired can be used as needed, but it may be recommended to have a sufficient number to enable lifting of the table 101 as may normally happen for moving it over obstacles, up or down stairs, etc.

Figure 29:
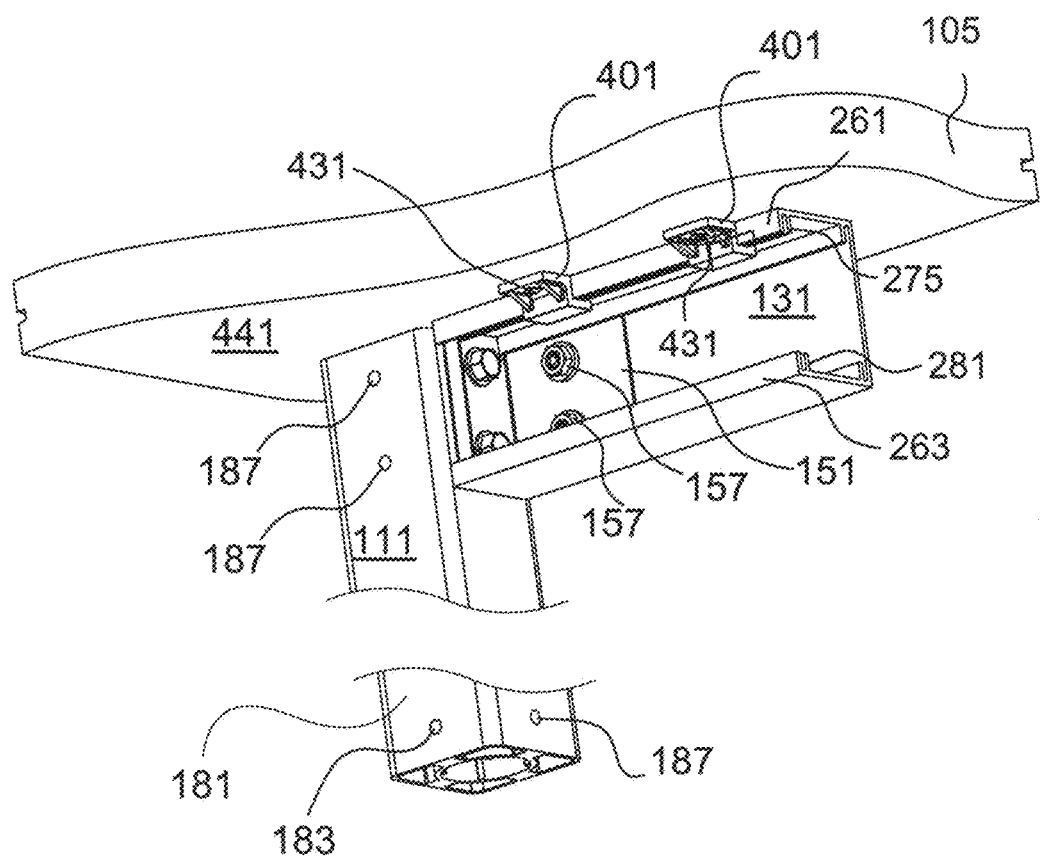
FIG. 29 is an underside perspective view similar to that seen in FIG. 28, but illustrating the final attachment bracket of FIGS. 25-27 joining an upper horizontal cross member to a plain planar table top.

Referring to FIG. 29, an underside perspective view similar to that seen in FIG. 28 is shown illustrating a position of final attachment and assembly of the component parts. There will likewise be easy access to the threaded members 431 in cases where the table top 105 needs to be removed. The attachment brackets 401 work well with single or multiple rectangular cell structures and can thus provide table top 105 holding attachment not only around a periphery of a large table 101, but also anywhere an upper cross member 121, 131 is made to lie adjacent an underside surface 441 of a table top 105 or the like.

Figure 30:
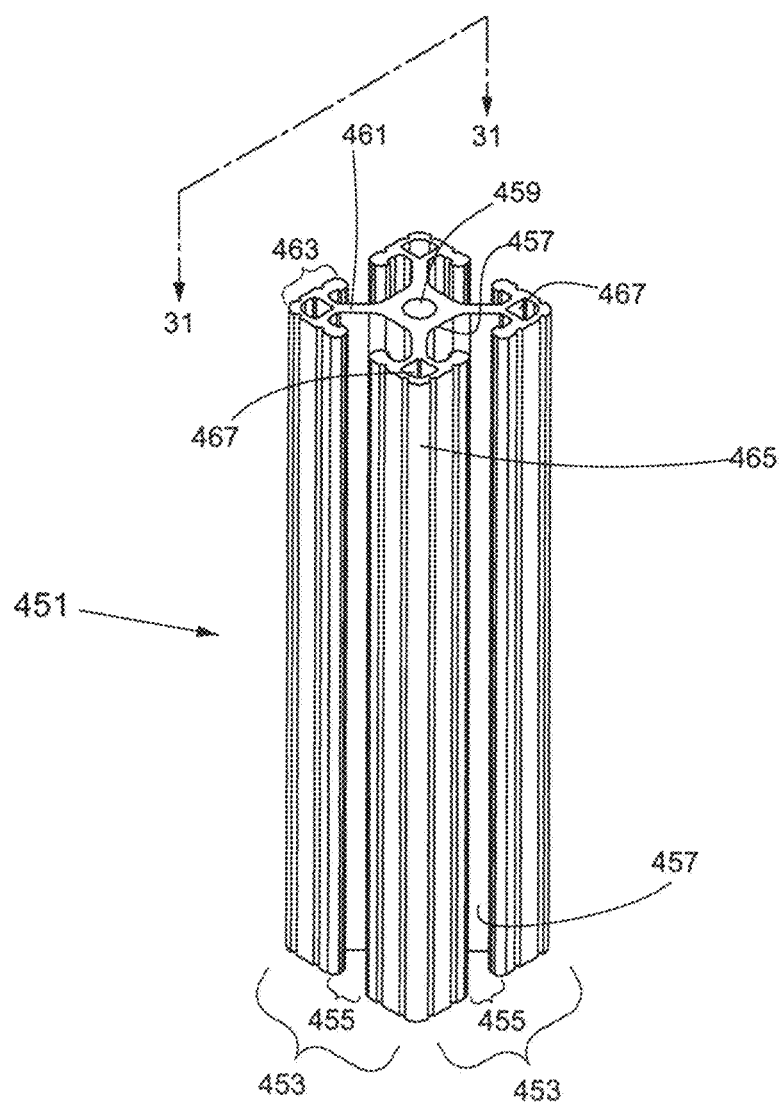
FIG. 30 is a perspective view of one example of commercially available extrusions shown in a vertical position and having four sides and four vertical slots, each at a center of the four vertical sides, as an example of how the principles used in the sturdy lightweight table base and method of the invention can be employed with many other structural components.

Referring to FIG. 30 a perspective view of one example of a commercially available extrusion 451 is seen as a vertical length of structure having a number of features that enable multi utilization. At the bottom of the section of extrusion 451 shown, sides 453 are shown as divided by a central slot opening 455. Central slot opening 455 leads to a laterally wider inside space 457 to facilitate engagement by a structure that might be restricted by the size of the central slot opening 455.

The details of the cross section of the extrusion 451 are best seen at the top of FIG. 30. A generally square core 457 has a circular cross section bore 459, and from what would otherwise be the four corners of the square core 457, a set of four extensions 461 lead to what might be referred to as arrow shaped structures each having a pair of abbreviated exterior surfaces 463 that are oriented ninety degrees from each other and that are located across an adjacent curved transition as a curved corner 465. Immediately behind the curved corner 465 is a bore 467. Many other configurations of commercially available extrusion having other features are available and the extrusion 451 is an example.

Figure 31:
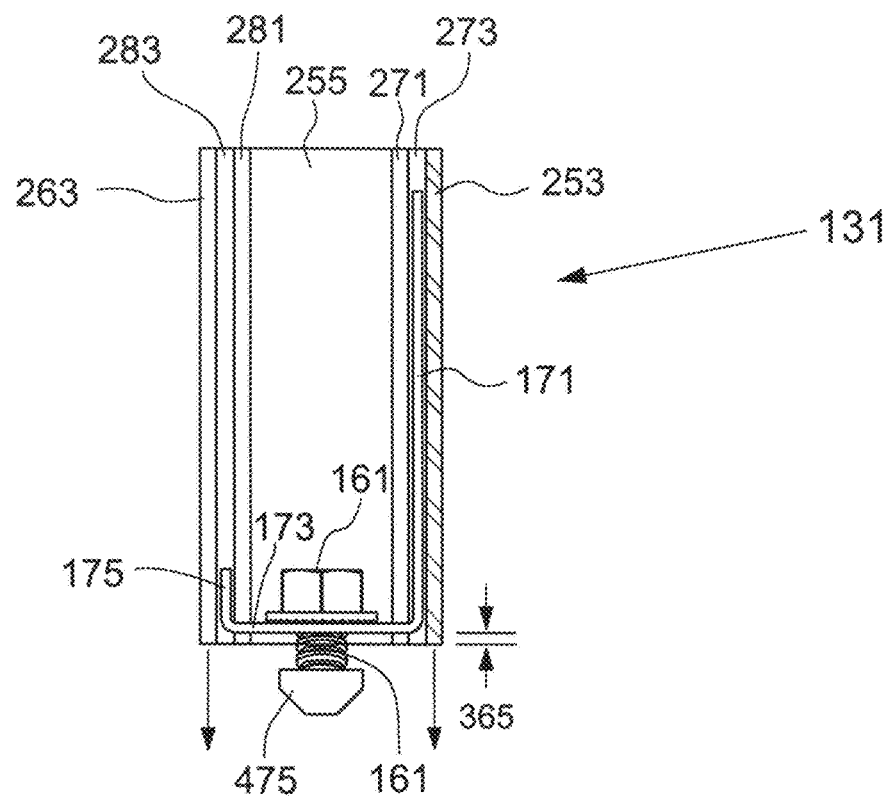
FIG. 31 is downward view looking into the commercially available extrusion taken along lines 31-31 shown in FIG. 30 and showing the approach of the horizontally oriented cross member and bracket similar to that seen in FIG. 13 but shown with the upper first wall removed to better illustrate the bracket with flange head screws engaging a adapter block.
Figure 31:
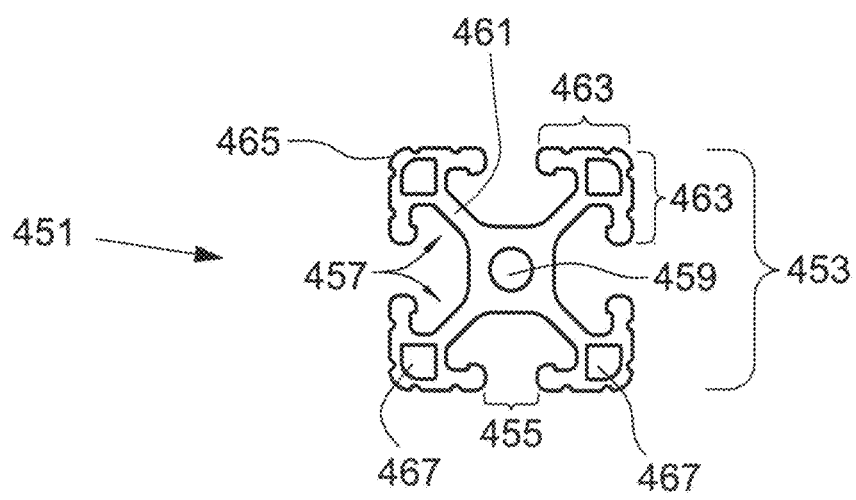

Referring to FIG. 31, a downward view looking into the commercially available extrusion taken along lines 31-31 of FIG. 30, is shown with a lateral approach of the horizontally oriented cross member 131 illustrated by a pair of parallel arrows. The upper first wall 251 of the cross member 131 is removed to better illustrate a position corner bracket 151 and serrated locking flange head screws 161 engaging an adapter block 475. The position and orientation of the cross member 131, corner bracket 151 and adapter block 475 is such that an approach as shown by the arrows, and a lift over or lowering under the extrusion 451 will allow the adapter block 475 to enter the central slot opening 455 from an end of the extrusion 451. Pre-attachment of the adapter block 475 to the serrated locking flange head screws 161 will enable more control than would be the case if the adapter block 475 enters slot opening 455 before insertion of the serrated locking flange head screws 161 through securing apertures 179 of the corner bracket at the time of initial threading into the adapter block 475.

Figure 32:
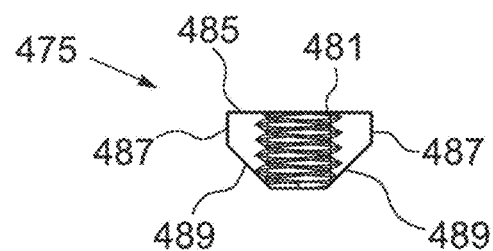
FIG. 32 is an end view illustrating one of the threads in broken line format extending through the adapter block.

Referring to FIG. 32, an end view illustrates more fully the shape of the adapter block 475. Although adapter block 475 could be of any shape that would allow it to be captured within the extrusion 451, it is important that sufficient material be available for engaging the threads of the pair of serrated locking flange head screws 161. Threaded bores 481, of which one is seen in FIG. 32, substantially occupy the volume of the adapter block 475 for strength and ability to hold significant force. Other shapes are possible for the adapter block 475, as well as the laterally wider inside space 457 of the commercially available extrusion 451.

Figure 33:
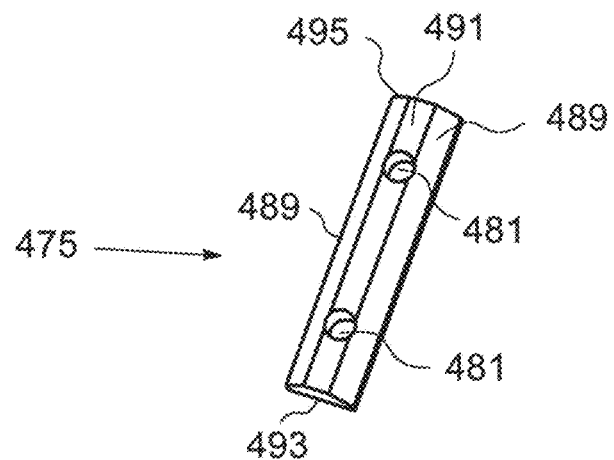
FIG. 33 is a perspective view illustrating the two, spaced apart threaded bores and the angled surfaces of the adapter block.
Figure 34:
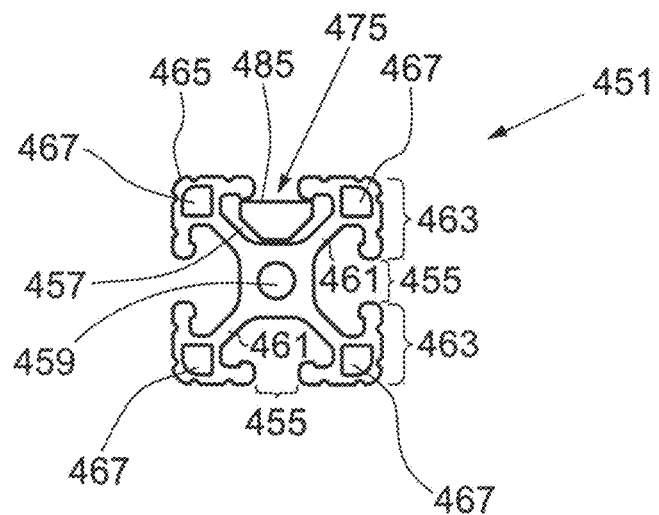
FIG. 34 is a top view looking down into the commercially available extrusion of FIGS. 30 and 31 with one of the slots occupied by an adapter block of FIGS. 31-33.

Adapter block 475 has a main side 485, a pair of parallel lateral sides 487, a pair of rear angled sides 489. Referring to FIG. 33 is a perspective view of the adapter block 475 enables a rear end side 491 two be seen along with the two, spaced apart threaded bores 481 can be seen. A first end 493 is seen, and a partial upper extent of second end 495 is seen at the uppermost part of FIG. 33. Referring to FIG. 34, a view of the extrusion 451 is seen with adapter block 475 shown in position within the laterally wider inside space 457. The outer portions of main side 485 of the adapter block 475 engage the inside rear portions of the pair of abbreviated exterior surfaces 463 to keep the adapter block 475 stably retained within the inside space 457.

Figure 35:
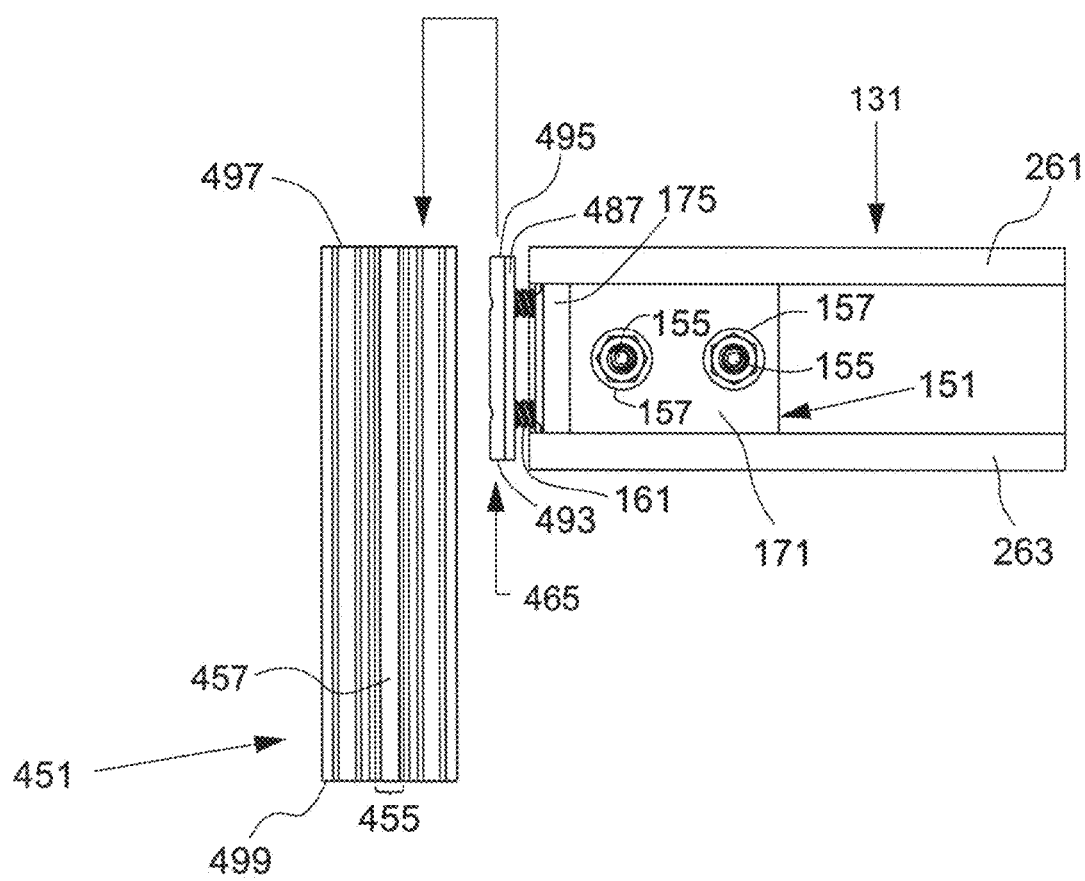
FIG. 35 is a side view looking into the open side of a cross member with the adapter block held loosely by the flange head bolts and in a position for the adapter block to be raised and lowered into a slot carried by the extrusion.

Referring to FIG. 35, a side view in a position similar to that illustrating the positions of the structures in FIG. 31, an advantageous manner of assembly is suggested. If the adapter block 475 is engaged and threaded a short distance onto the threaded ends of the serrated locking flange head screws 161, the cross member 131, corner bracket 151 and adapter block 475 assembly of FIGS. 31 and 35 is formed. Further, making-up this assembly before engagement with the extrusion 451 enables easier manual manipulation and access of the components. Once the assembly seen in FIG. 35 is made up, the translation of this assembly around an end, including an upper end 497 or lower end 499 of the extrusion 451, enables the adapter block 475 to be slidably inserted into the laterally wider inside space 457 of the extrusion 451. The advantage of this technique is that less tightening and thread-start activity is required. Conversely, where multiple members 131 are to be fitted into one extrusion 451, they may need to be loaded into the central slot opening 455 and later serially brought to their proper level before the serrated locking flange head screws 161 are further tightened to attach members 131 to fix their height with respect to the extrusion 451.

Figure 36:
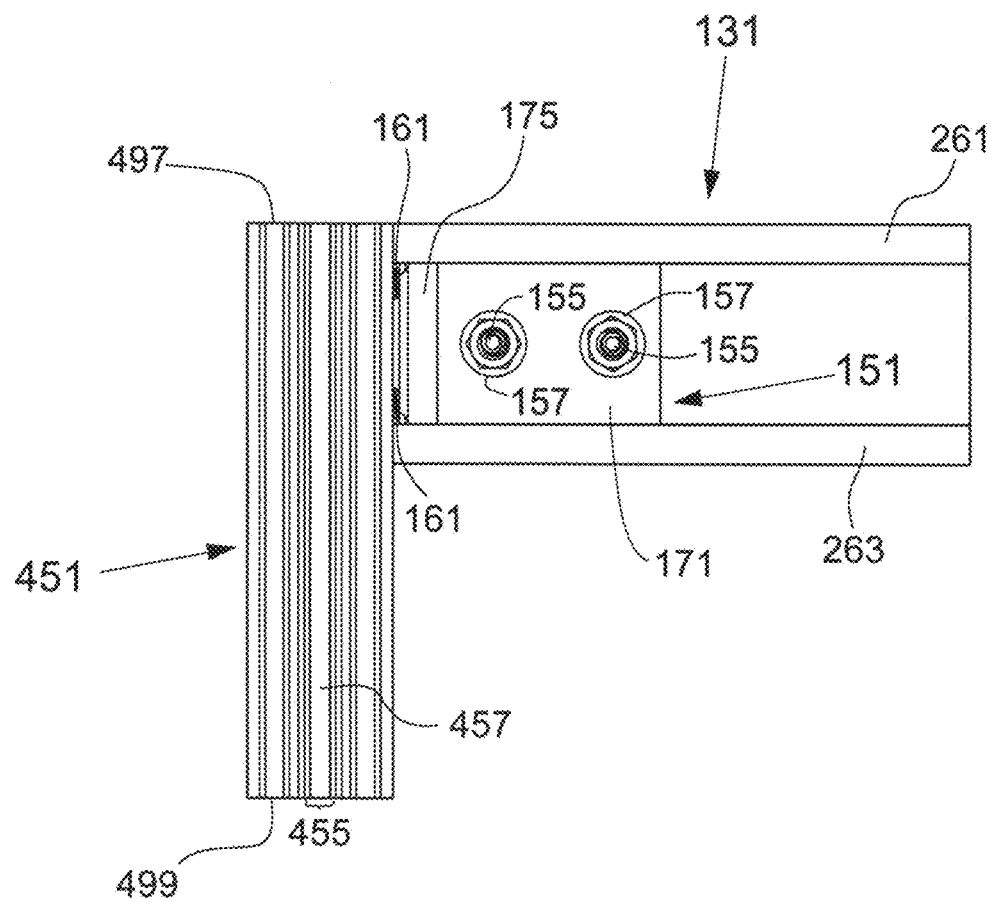
FIG. 36 is a view similar to the view of FIG. 35 after the cross member is brought level with the top of the extrusion and after the flange head bolts are finger tightened, but before further tightening causes deformation of the corner bracket.

Referring to FIG. 36, a view similar to the view of FIG. 35 after the cross member 131 is brought level with the top of the extrusion and after the serrated locking flange head screws 161 are only partially tightened, but before further tightening causes deformation of the corner bracket 151. Other surface enhancements and coatings (neither of which are shown) can be employed to further the ability of cross member 131 and adapter block 475 to resist vertical movement with respect to the and extrusion 451. Other commercially available extrusions, like extrusion 451, may require different accommodation structures that enable effective use of the cross member 131.

While the present invention has been described in terms of a system for producing a wide range of sizes for a sturdy, square table support, the structures techniques employed herein are applicable to a wide range of devices and methods to provide easily producible and constructable components. Although the invention has been derived with reference to particular illustrative embodiments thereof, many changes and modifications of the invention may become apparent to those skilled in the art without departing from the spirit and scope of the invention. Therefore, included within the patent warranted are all such changes and modifications as may reasonably and properly be included within the scope of this contribution to the art.

What is claimed:

1. A tension structure arrangement for a table, comprising:
   a first post having a first threaded cross member attachment bore surrounded by a first flattened area
   a first cross member having a first square cut end for complementarily abutting and forming a stabilizing right angle with respect to the first flattened area of the first post, and a second end;
   a first corner bracket having first planar member attached generally parallel to the first cross member, and having a second planar member at an angle with respect to the first planar member, the second planar member inset from the first end of the first cross member to provide a space within which the second planar member of the first corner bracket may deform when the second planar member is urged toward the first post while the first cross member first end is abuttably engaged against the first flattened area of the first post;
   a first threaded member engaged with the threaded first cross member attachment bore of the first post, the first threaded member also engaged with the second planar member of the first corner bracket at a position spaced from the first planar member to urge the second planar member toward the first post.

2. The tension structure arrangement as recited in claim 1 wherein the first planar member and the second planar member of the first corner bracket meet at a first corner, and wherein the second planar member is arranged to initially springingly angularly displace away from the first planar member when the first threaded member engaged with the threaded first cross member attachment bore of the first post urges the second planar member toward the first post.

3. The tension structure arrangement as recited in claim 2 wherein the second planar member is arranged to deform adjacent engagement with the threaded member after initially springingly angularly displacing away from the first planar member.

4. The tension structure arrangement as recited in claim 3 wherein the first and second planar member is arranged to deform the first corner of the first corner bracket during the second planar member deformation adjacent engagement with the threaded member.

5. The tension structure arrangement as recited in claim 4 wherein the bracket includes a third planar member at an angle with respect to the second planar member, to reinforce and stabilize the portion of the second planar member closest to the second planar member contact with the first post.

6. The tension structure arrangement as recited in claim 5 wherein at least one of the first and second walls includes at least one slot wall between the common wall and at least one of the slot end walls.

7. The tension structure arrangement as recited in claim 5 wherein the first corner bracket is attached to the common wall.

8. The tension structure arrangement as recited in claim 1 wherein the first cross member has a cross sectional "C" shape including a first wall, a common wall attached to the first wall, and a second wall attached to the common wall, the first and second walls are parallel to each other and where the common wall is attached to each of the first and second walls at a right angle, a first outer slot end wall extending from the first wall at a right angle with respect to the first wall and extending in a direction of the second wall, a second outer slot end wall extending from the second wall at a right angle with respect to the second wall and extending in a direction of the first wall, and parallel with respect to the first outer slot end wall.

9. The tension structure arrangement as recited in claim 1 and further comprising:
a second post having a first threaded cross member attachment bore surrounded by a first flattened area;
and wherein the first cross member second end is for complementarily abutting and forming a stabilizing right angle with respect to the first flattened area of the second post;
a second corner bracket having first planar member attached generally parallel to the first cross member, and having a second planar member at an angle with respect to the first planar member, the second planar member inset from the second end of the first cross member to provide a space within which the second planar member of the second corner bracket may deform when the second planar member is urged toward the first post while the first cross member second end is abuttably engaged against the second flattened area of the second post;
a second threaded member engaged with the threaded first cross member attachment bore of the second post, the second threaded member also engaged with the second planar member of the second corner bracket to urge the second planar member toward the second post.

10. The tension structure arrangement as recited in claim 1 and further including second, third and fourth posts wherein each of the first, second, third and fourth posts each include the first and a second threaded cross member attachment bore each surrounded by a first and a second flattened area, respectively;
and wherein each of the first, second, third and fourth posts is attached to their respective first cross member and wherein each first cross member second end is for complementarily abutting and forming a stabilizing right angle with respect to each successive second, third, fourth and first posts to form a rectangular cell having strong right angled relationship with their respective second flattened areas with the use of a second corner bracket, identical to the first corner bracket, the second corner bracket mounted adjacent each second end of each of the first cross members of each of the first, second, third and fourth posts;
Each of the second corner brackets associated with a second threaded member for threaded engagement with the second threaded first cross member attachment bores of each successive second, third, fourth and first posts urge the second planar members of the second corner brackets toward their respective second flattened areas of the successive second, third, fourth and first posts to form the rectangular cell having strong right angled relationship.

11. The tension structure arrangement as recited in claim 10 and wherein each first and second flattened area on each of the successive first, second, third, fourth and first posts are spaced from each other along an axial length of the posts.

12. The tension structure arrangement as recited in claim 1 and wherein the first post includes a second threaded cross member attachment bore surrounded by a second flattened area;
a second cross member having a first end for complementarily abutting and forming a stabilizing right angle with respect to the second flattened area of the first post;
a second corner bracket having first planar member attached generally parallel to the second cross member, and having a second planar member at an angle with respect to the first planar member, the second planar member inset from the first end of the second cross member to provide a space within which the second planar member of the second corner bracket may deform when the second planar member is urged toward the first post while the second cross member first end is abuttably engaged against the second flattened area of the first post;
a second threaded member engaged with the second threaded second cross member attachment bore of the first post, the second threaded member also engaged with the second planar member of the second corner bracket to urge the second planar member of the second corner bracket toward the first post.

* * * * *